United States Patent
Hou et al.

(10) Patent No.: US 12,087,498 B2
(45) Date of Patent: Sep. 10, 2024

(54) MODULE WITH REVERSELY COUPLED INDUCTORS AND MAGNETIC MOLDED COMPOUND (MMC)

(71) Applicant: TEXAS INSTRUMENTS INCORPORATED, Dallas, TX (US)

(72) Inventors: Dongbin Hou, Plano, TX (US); Sombuddha Chakraborty, Redwood City, CA (US); Kenji Kawano, Nagano (JP); Jeffrey Morroni, Parker, TX (US); Yuki Sato, Saitama-ken (JP)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/405,017

(22) Filed: Aug. 17, 2021

(65) Prior Publication Data

US 2021/0375537 A1 Dec. 2, 2021

Related U.S. Application Data

(62) Division of application No. 16/233,804, filed on Dec. 27, 2018, now Pat. No. 11,094,455.

(51) Int. Cl.
| | | |
|---|---|---|
| H01F 17/04 | (2006.01) | |
| H01F 27/02 | (2006.01) | |
| H01F 27/24 | (2006.01) | |
| H01F 27/28 | (2006.01) | |
| H01F 27/34 | (2006.01) | |
| H01F 41/00 | (2006.01) | |
| H02M 3/158 | (2006.01) | |

(52) U.S. Cl.
CPC ......... *H01F 27/346* (2013.01); *H01F 27/022* (2013.01); *H01F 27/24* (2013.01); *H01F 27/2847* (2013.01); *H01F 41/005* (2013.01); *H02M 3/1584* (2013.01); *H02M 3/1586* (2021.05)

(58) Field of Classification Search
USPC .................................................. 336/219, 221
See application file for complete search history.

(56) References Cited

U.S. PATENT DOCUMENTS

| | | | | |
|---|---|---|---|---|
| 2005/0212643 A1* | 9/2005 | Kuroiwa | ............... | H01F 27/292 336/200 |
| 2010/0007457 A1* | 1/2010 | Yan | .......................... | H01F 3/14 336/234 |
| 2011/0148560 A1* | 6/2011 | Ikriannikov | .......... | H01F 27/306 336/192 |
| 2017/0047155 A1* | 2/2017 | Yao | .......................... | H01F 17/04 |

* cited by examiner

*Primary Examiner* — Ronald Hinson
(74) *Attorney, Agent, or Firm* — Ming Wai Choy; Frank D. Cimino

(57) ABSTRACT

A device includes a first inductor and a second inductor reversely coupled with the first inductor. The first and second inductors have overlapping windings. The device also includes a housing for the first and second inductor. The housing is filled with a magnetic molding compound.

17 Claims, 18 Drawing Sheets

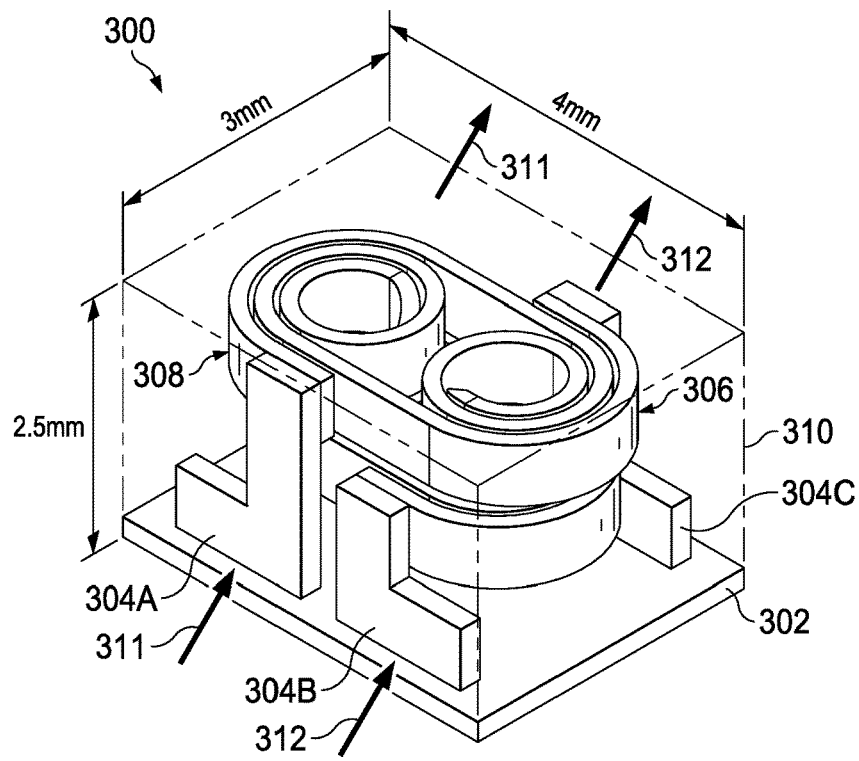
FIG. 3A
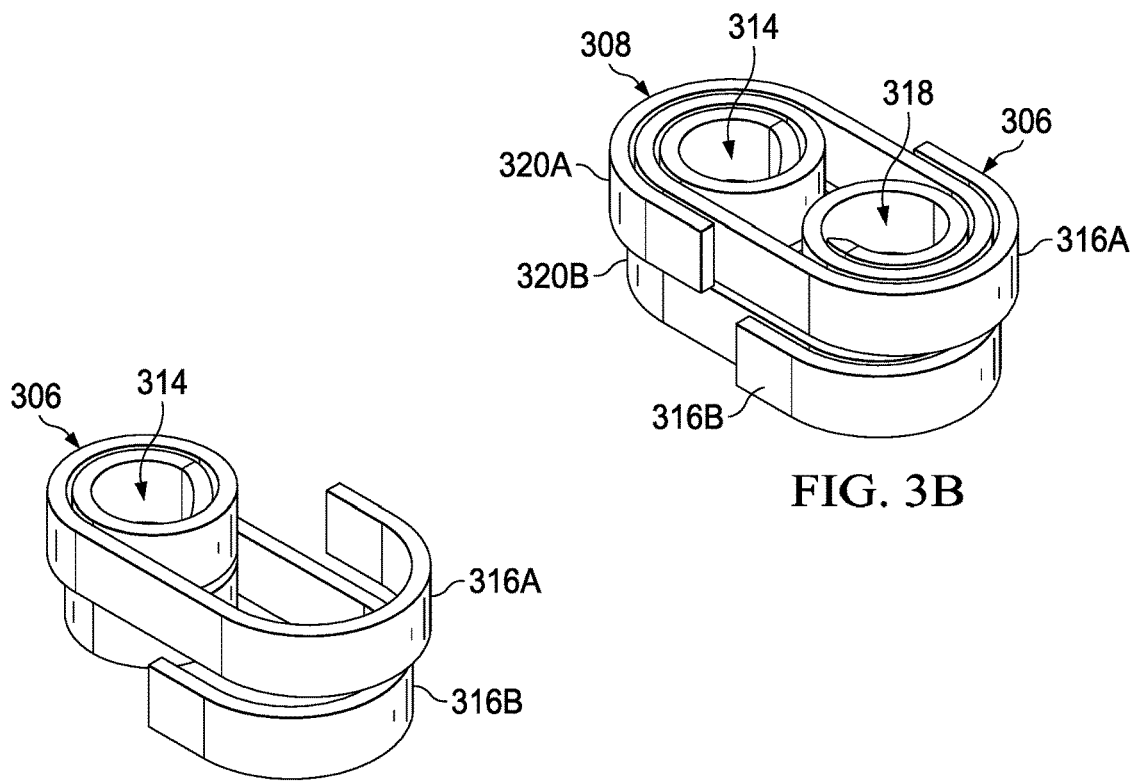
FIG. 3B
FIG. 3C

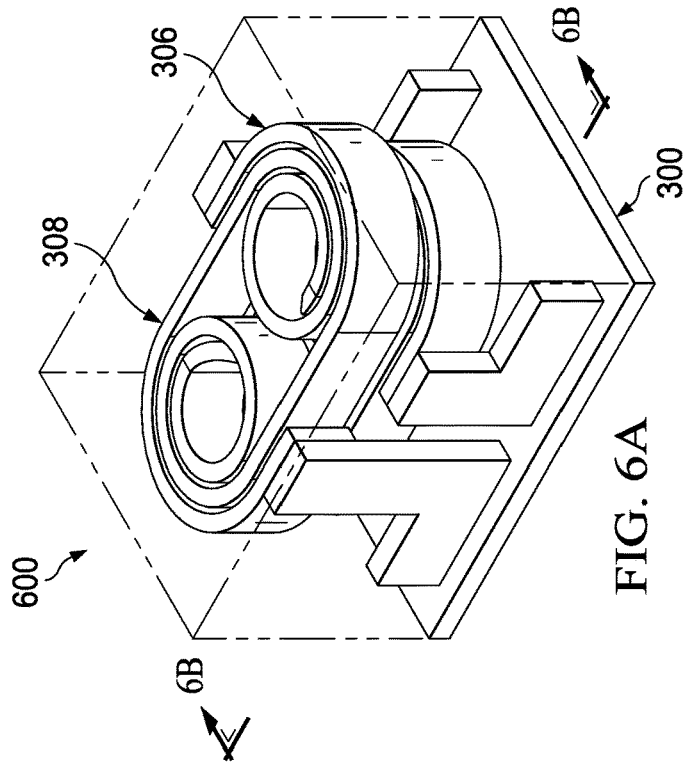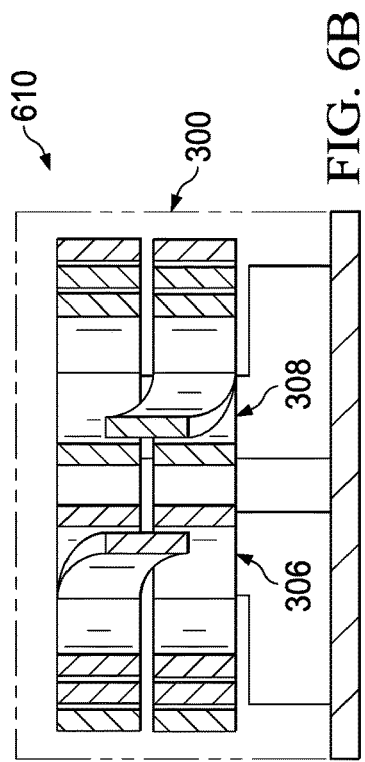
FIG. 6A
FIG. 6B
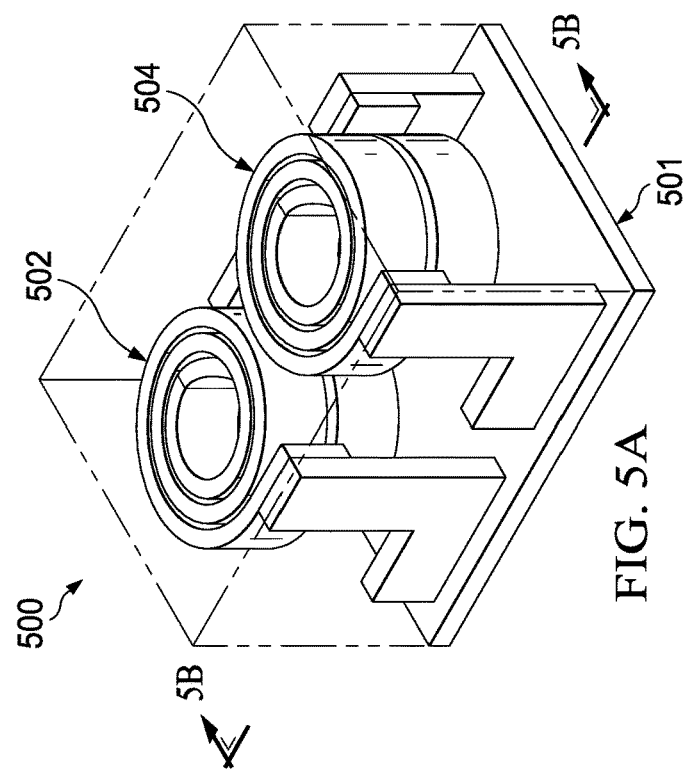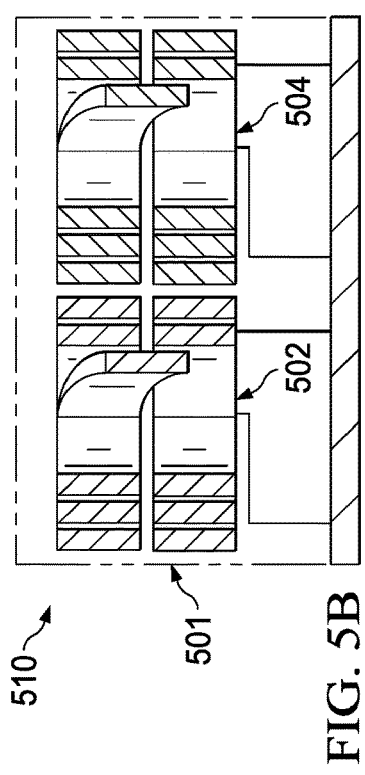
FIG. 5A
FIG. 5B

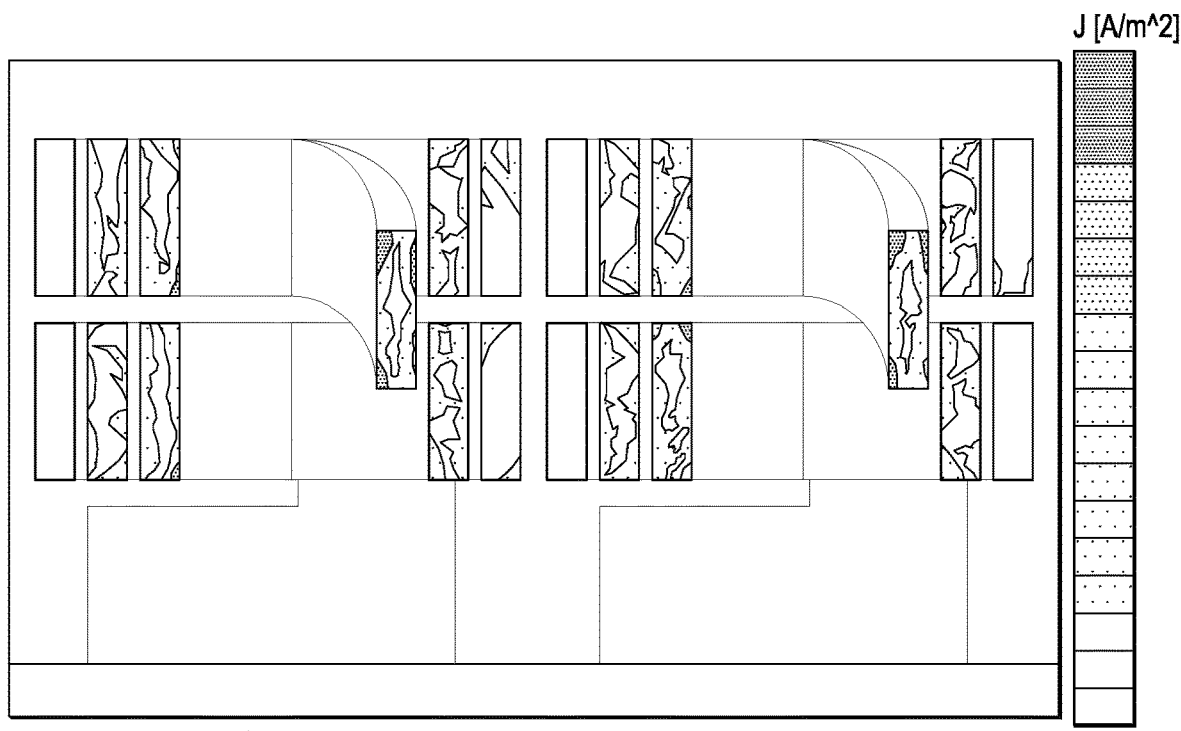
520  FIG. 5C
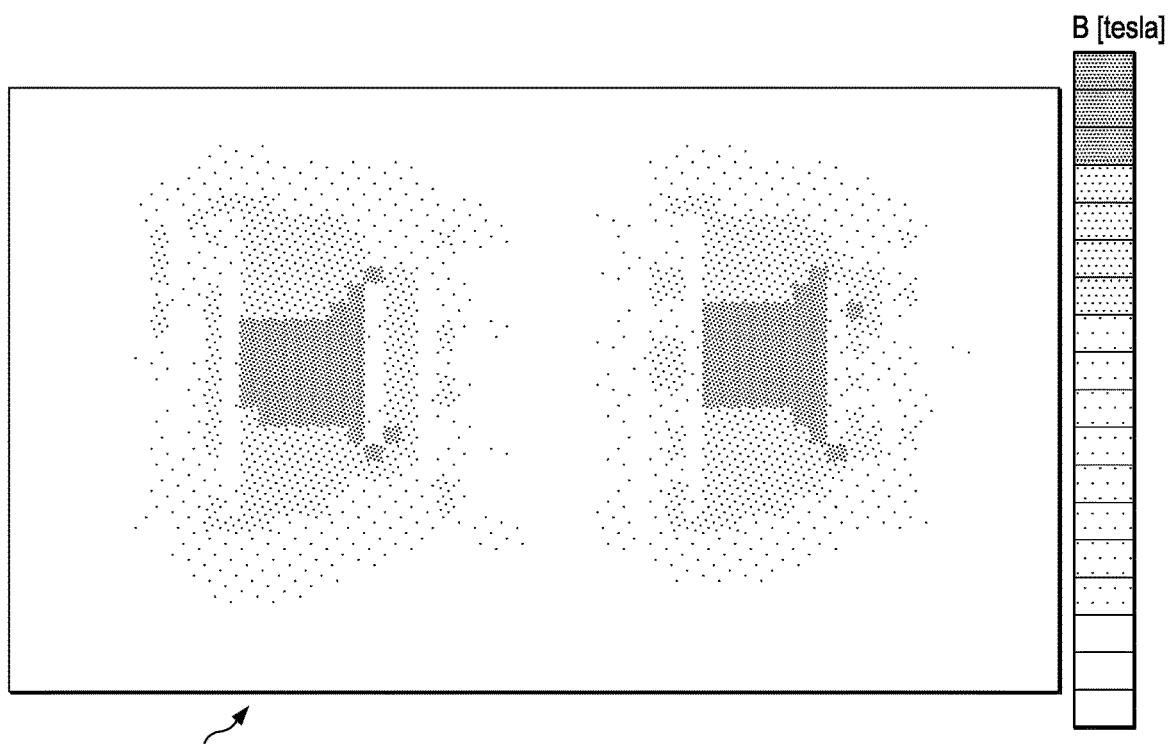
530  FIG. 5D

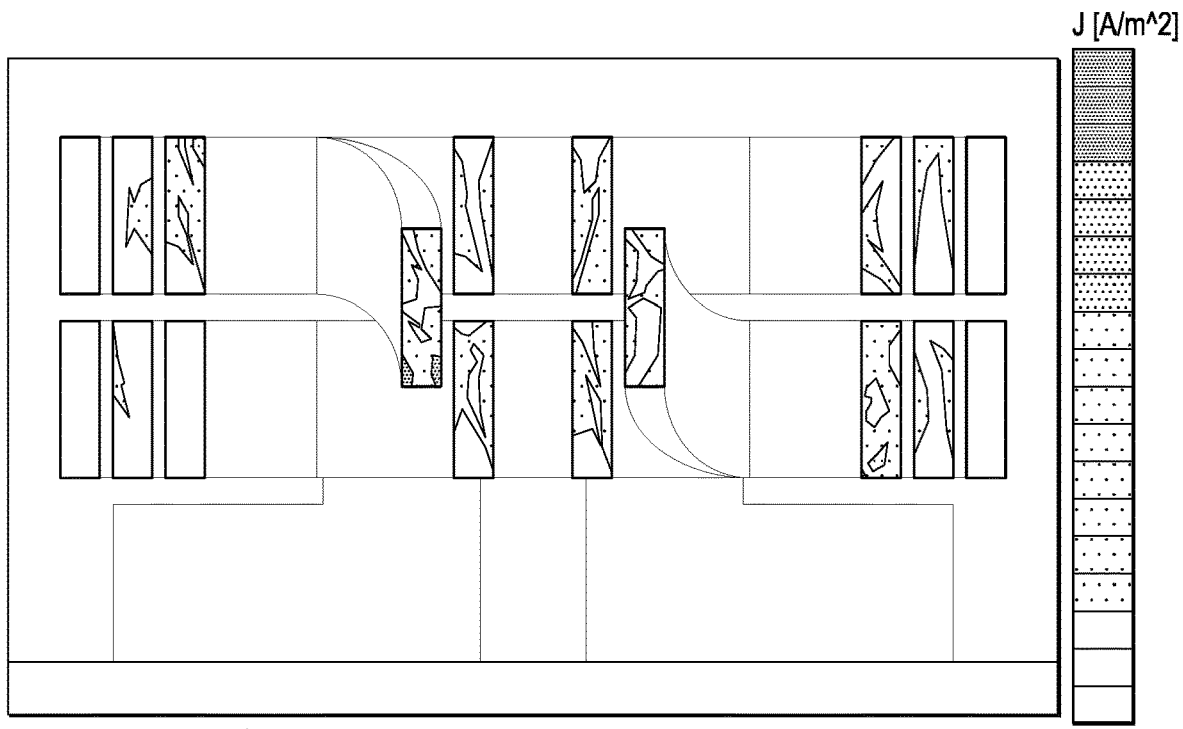
620　FIG. 6C
630　FIG. 6D

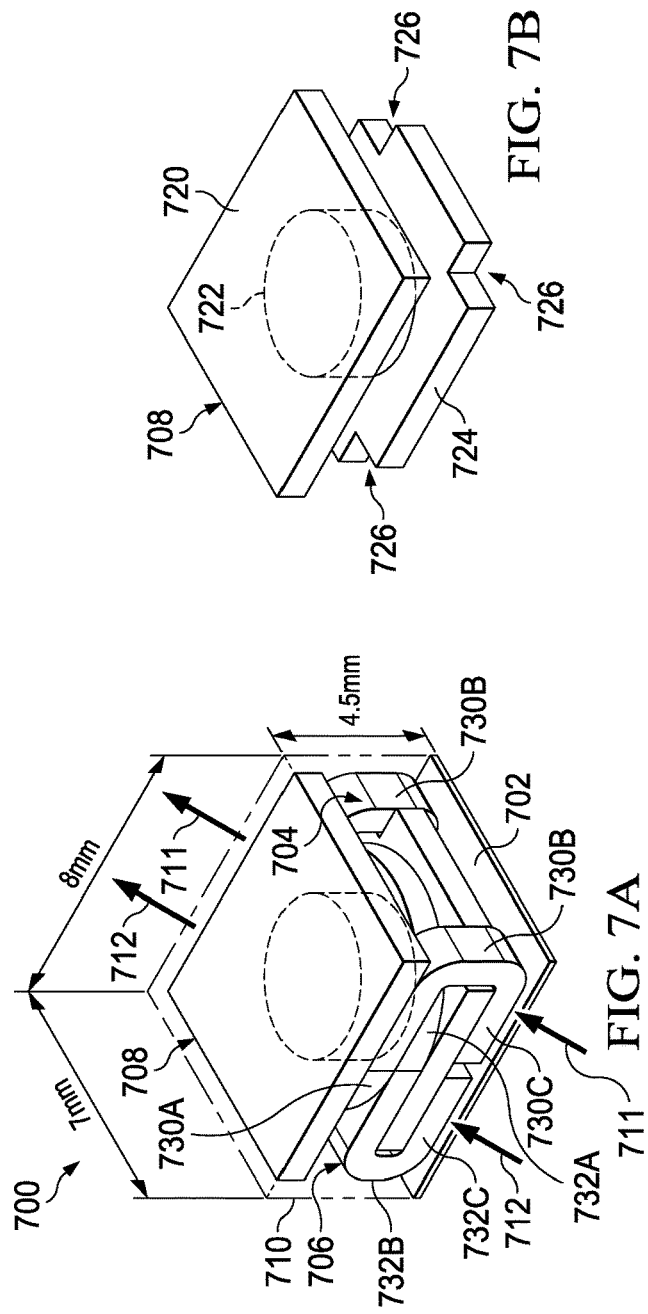

MODULE WITH REVERSELY COUPLED INDUCTORS AND MAGNETIC MOLDED COMPOUND (MMC)

CROSS-REFERENCE TO RELATED APPLICATION

This application is a divisional of U.S. patent application Ser. No. 16/233,804 filed Dec. 27, 2018, which is incorporated herein by reference.

BACKGROUND

An inductor is a passive two-terminal device that stores energy in a magnetic field when current passes through the inductor. An example inductor includes an insulated conductor wrapped around a core. One example use of an inductor is at the output of a buck converter to store energy. The design of the inductor is not trivial and affects losses due to the intrinsic resistivity of the conductor material and frequency-dependent losses such as core-material losses (magnetic hysteresis loss, eddy-current loss), skin-effect losses in the conductor (current displacement at high frequencies), magnetic-field losses of adjacent windings (proximity effect), and radiation losses.

In a multi-phase converter, a plurality of converter circuits, each with its own output inductor, are clocked at different phases and the outputs from the plurality of converter circuits are combined. With a multi-phase converter, the amount of ripple in the converter output is reduced compared to single phase converters. Again, the design of inductors used in a multi-phase converter is not trivial.

SUMMARY

In at least one example, a device includes a first inductor and a second inductor reversely coupled with the first inductor. The first and second inductors have overlapping windings. The device also includes a housing for the first and second inductor. The housing is filled with a magnetic molding compound.

In at least one example, a method includes arranging a first inductor and a second inductor in a reversely coupled configuration. The first and second inductors have overlapping windings. The method also includes positioning the first and second inductors in a housing, and filling the housing with a magnetic molding compound.

BRIEF DESCRIPTION OF THE DRAWINGS

FIGS. 3A-3F are different views of a reversely coupled inductor module in accordance with various examples.

FIGS. 5A-5B are different views of an inductor module in accordance with various examples.

FIG. 5C is a graph showing current density for the inductor module of FIGS. 5A and 5B.

FIG. 5D is a graph showing the magnetic flux density for the inductor module of FIGS. 5A and 5B.

FIGS. 6A-6B are different views of the reversely coupled inductor module of FIGS. 3A-3F in accordance with various examples.

FIG. 6C is a graph showing current density for the reversely coupled inductor module of FIGS. 6A and 6B.

FIG. 6D is a graph showing the magnetic flux density for the reversely coupled inductor module of FIGS. 6A and 6B.

FIGS. 7A-7D are different views of a reversely coupled inductor module in accordance with various examples.

FIG. 8A is a cross-sectional view of the reversely coupled inductor module related to FIGS. 7A-7D.

DETAILED DESCRIPTION OF EXAMPLE EMBODIMENTS

Figure 1:
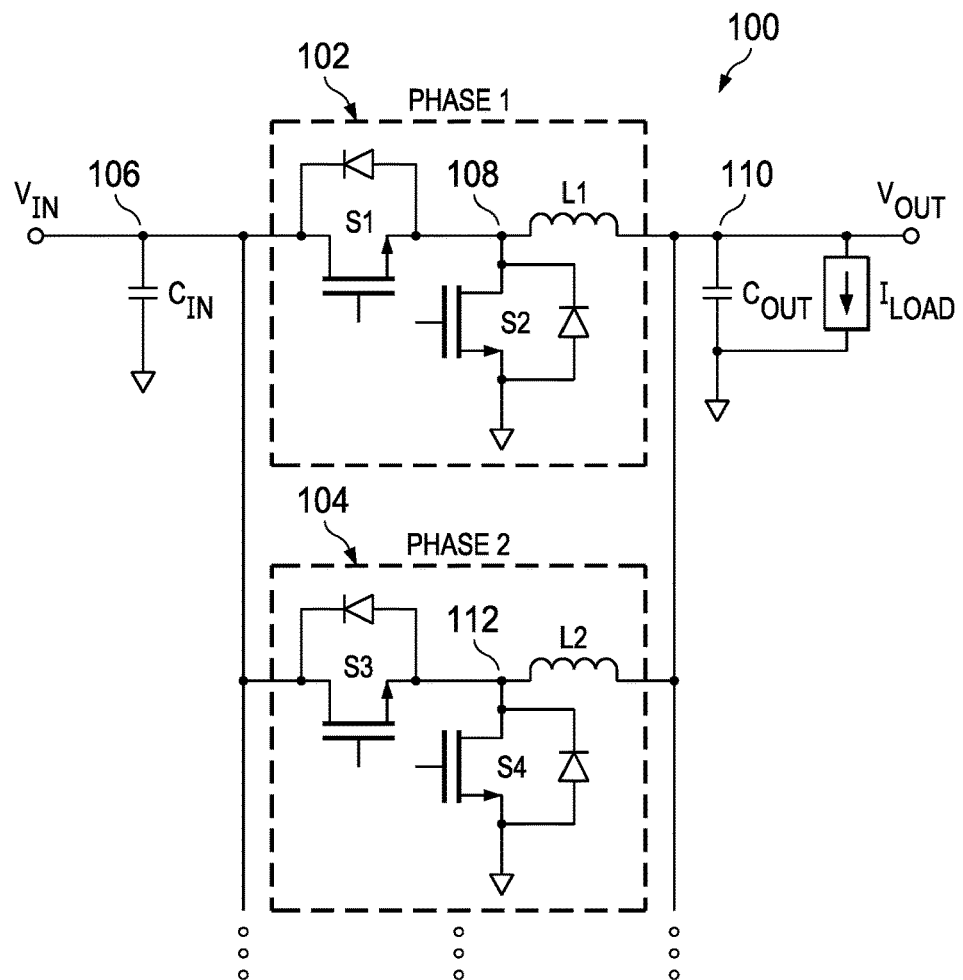
FIG. 1 is a schematic diagram showing a multi-phase converter in accordance with various examples.

Described herein are modules with reversely coupled inductors and magnetic molded compound (MMC). In some examples, a module includes a first inductor and a second inductor reversely coupled with the first inductor, wherein the first and second inductors have overlapping windings. The module also includes a housing for the first and second inductor, wherein the housing is filled with MMC. In different examples, the first and second inductors are symmetrical or asymmetrical. Also, in different examples, magnetic cores are used or are omitted. When used, the shape and/or orientation of the magnetic core varies. As used herein, an "inductor" refers to a component with two terminals and at least one winding coupled between the two terminals. As an option, an inductor includes a magnetic core. As used herein, "coupled inductors" are different than transformers because the coupling coefficient is generally less than a transformer. An example coupling coefficient for coupled inductors in 90% or less. Meanwhile, an example coupling coefficient for a transformer is higher than 95%.

In some examples, to assemble a module with reversely coupled inductors and MMC, a module base with terminals or contacts is used, where the first and second inductors are coupled to the module base. In some examples, a die with multi-phase converter circuitry is also included with or coupled to the module base. In some examples a non-magnetic molding material is positioned between the module base and the overlapping windings of the first and second inductors. In some examples, a magnetic core is positioned in the center of the overlapping windings of the first and second inductors. In different examples, parts of the first and second inductors are positioned relative to a magnetic core with an H-shape or T-shape. After the first and second inductors are coupled to the module base with any magnetic core and/or non-magnetic molding material in place, MMC is added. In some examples, a housing is used, where MMC fills the available space between and around components of the module and the housing. The housing used to shape the MMC is either permanent or temporary.

With the described modules, the distributed air gaps in MMC absorbs direct-current bias fields, reduces electromagnetic interference (EMI), and reduces a fringing effect. Also, with the overlapping windings of the first and second inductors, high inductance density and strong coupling with the same current direction is achieved. In some examples, the current direction is the same from the terminal point of view, but is not always the same inside the module. For at least some described modules, the coupling coefficient between phases in the range of 20%-80% (stronger than non-coupled inductors and weaker than transformers). As desired, a magnetic core is added to increase an inductance density and/or a coupling coefficient. In some examples, the modules are designed to achieve a target reverse coupling (e.g., at least 20%), a phase current ripple that is less than a target threshold, and transient performance that has a target threshold for overshoot, undershoot, setting time, etc.

In some described modules, a coupled inductor working in a two-phase buck converter has two equivalent inductances: a steady-state inductance $L_{ss}$, which impacts the steady state phase current ripple (a larger $L_{ss}$ value is targeted in some examples) and a transient inductance $L_{tr}$, which impacts the load transient response (a smaller $L_{tr}$ value is targeted in some examples). For a given set of inductors, the $L_{ss}$ and $L_{tr}$ is determined by the inductor structures and materials, and the $L_{ss}$ and $L_{tr}$ values are characterized by the inductor current waveform during steady state operation and load transient condition. In the described modules, a reversely coupled inductor has a desired feature ($L_{ss}>L_{tr}$) so that a small steady state phase current and a fast transient response can be achieved together. To provide a better understanding, various options for modules with reversely coupled inductors and MMC are described using the figures as follows.

FIG. 1 is a schematic diagram showing a multi-phase converter 100 in accordance with various examples. As shown, the multi-phase converter 100 includes a first buck converter circuit 102 with switches, S1 and S2, coupled between a supply voltage node 106 (to provide Vin) and a ground node. More specifically, Vin is maintained by an input capacitor, Cin, which is represented as separate from the first buck converter circuit 102. In FIGS. 1, S1 and S2 are represented as NMOS transistors with respective control terminals and current terminals, where each of S1 and S2 have a diode across their respective current terminals. In other examples, the components and/or arrangement of components for S1 and S2 may vary. Between S1 and S2 is a switch node 108, where an output inductor (L1) for the first buck converter circuit 102 has one side coupled to the switch node 108. The other side of L1 is coupled to an output node 110 for the multi-phase converter 100.

As shown, the multi-phase converter 100 also includes a second buck converter circuit 104 with switches, S3 and S4, coupled between the supply voltage node 106 (to provide Vin) and a ground node. Again, Vin is maintained by Cin, which is represented as separate from the second buck converter circuit 104. In FIGS. 1, S3 and S4 are represented as NMOS transistors with respective control terminals and current terminals, where each of S3 and S4 have a diode across their respective current terminals. Between S3 and S4 is a switch node 112, where an output inductor (L2) for the second buck converter circuit 104 has one side coupled to the switch node 112. The other side of L2 is coupled to the output node 110 for the multi-phase converter 100.

In FIG. 1, the outputs from the first and second buck converters 102 and 104 are combined at the output node 110 (resulting in Vout) and provided to an output capacitor, Cout, for use by a load, which draws a current (ILoad). As represented in FIG. 1, the multi-phase converter 100 may include additional buck converters. To reduce output ripple in Vout, the switches of each of the buck converters are operated at different phases. Also, in some examples, L1 and L2 are provided using a module with reversely coupled inductors and MMC as described herein. With the proposed modules, output inductors such as L1 and L2 achieve target performance criteria such as a target reverse coupling (e.g., at least 20%), a phase current ripple that is less than a target threshold, and transient performance that has a target threshold for overshoot, undershoot, setting time, etc.

Figure 2:
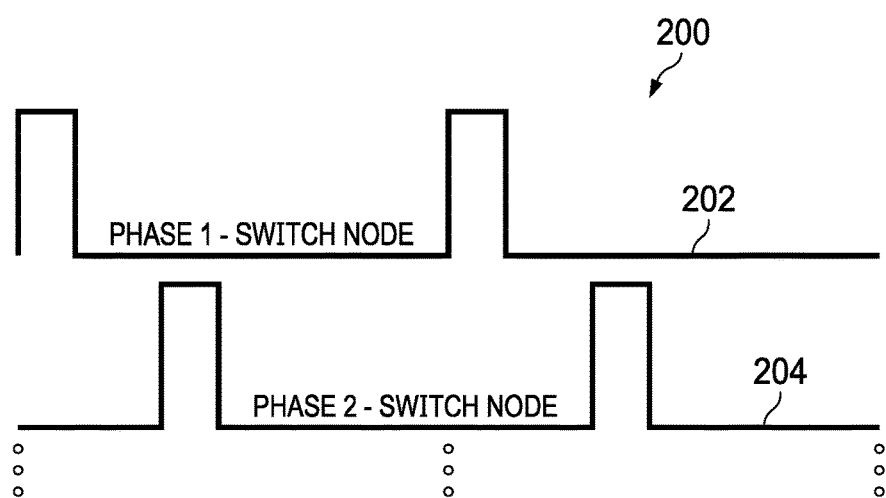
FIG. 2 is a graph showing switch node signals of a multi-phase converter in accordance with various examples.

FIG. 2 is a graph 200 showing switch node signals 202 and 204 of a multi-phase converter in accordance with various examples. In graph 200, the switch node signal 202 corresponds to a first phase (phase 1) of energy provided to L1 by the operations of the first buck converter 102 in FIG. 1. Meanwhile, the switch node signal 204 corresponds to a second phase (phase 2) of energy provided to L2 by the operations of the second buck converter 104 in FIG. 1. By offsetting phase 1 and phase 2 of a multi-phase converter such as the multi-phase converter 100 of FIG. 1, output voltage (Vout) ripple is reduced.

Figure 3D:
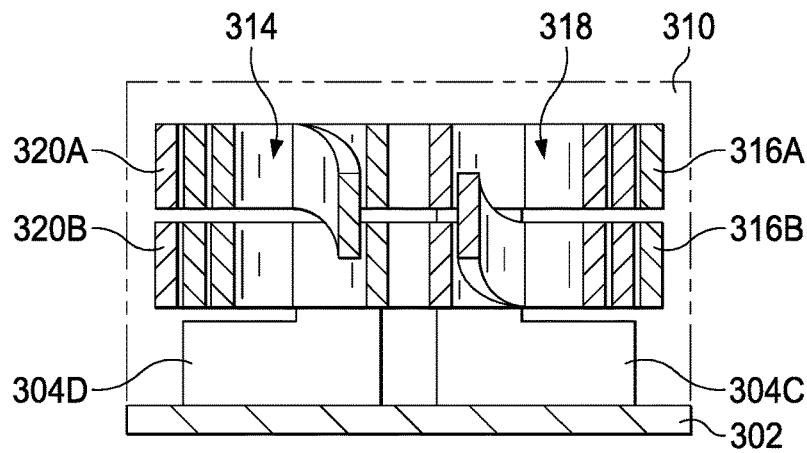

FIGS. 3A-3F are different views of a reversely coupled inductor module 300 in accordance with various examples. As shown in FIG. 3A, the module 300 includes a base (e.g., a leadframe base) 302. Attached to the base 302 are side contacts 304A-304D (only side contacts 304A-304C are visible in FIG. 3A) for a first inductor 306 and a second inductor 308. More specifically, the side contacts 304B and 304C are coupled to side terminals of the first inductor 306, while the side contacts 304A and 304D are coupled to side terminals of the second inductor 308. Also, MMC 310 fills the space around the first and second inductors 306 and 308. In operation, a current 312 flows through the side contacts 304B and 304C and through the first inductor 306 in a given direction. Also, a current 311 flows through the side contacts 304A and 304D and through the second inductor 308 in the same direction as the current 312 at the terminals of the module 300. In the example of FIG. 3A, the dimensions of the module 300 is 4 mm×3 mm×2.5 mm. In other examples, the dimensions for a module such as the module 300 vary in one or more dimensions.

In FIG. 3B, the first and second inductors 306 and 308 are described in greater detail. More specifically, the first inductor 306 is a multi-level winding that includes a primary winding 314 with an upper winding extension 316A and a lower winding extension 316B, where each of the upper winding extension 316A and the lower winding extension 316B has a curved (e.g., hook) shape. Similarly, the second inductor 308 is a multi-level winding that includes a primary winding 318 with an upper winding extension 320A and a lower winding extension 320B, where each of the upper winding extension 320A and the lower winding extension 320B has a curved (e.g., hook) shape. FIG. 3C shows a close up view of the first inductor 306 with the primary winding 314, the upper winding extension 316A, and the lower winding extension 316B. In some examples, the second inductor 308 has the same shape as the first inductor 306, and is oriented 180 degrees opposite of the first inductor 306. When the first and second inductors 306 and 308 are assembled as represented in FIG. 3B, the upper and lower winding extensions 316A and 316B of the first inductor 306 wrap around the primary winding 318 of the second inductor 308. Meanwhile, the upper and lower winding extensions 320A and 320B of the second inductor 308 wrap around the primary winding 314 of the first inductor 306. With the arrangement represented in FIG. 3B, the first and second inductors 306 and 308 are described herein as having overlapping windings in the form of a multi-level entangled arrangement or multi-level embrace arrangement.

FIG. 3D shows a cross-sectional view of the module 300 of FIG. 3A. In FIG. 3D, the primary winding 314, the upper winding extension 316A, and the lower winding extension 316B of the first inductor 306 is shown relative to the primary winding 318, the upper winding extension 320A, and the lower winding extension 320B of the second inductor 308. Also in FIG. 3D, the base 302, the side contacts 304C and 304D, and the MMC 310 are represented.

Figure 3E:
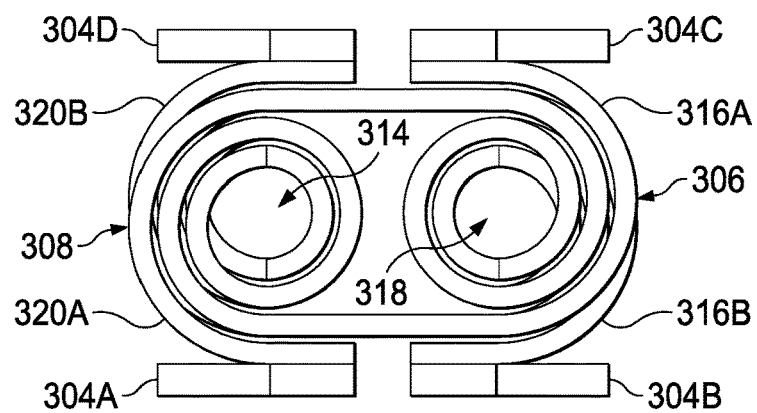

FIG. 3E shows a top view of some components of the module 300. In FIG. 3E, portions of the primary winding 314, the upper winding extension 316A, and the lower winding extension 316B of the first inductor 306 are visible. Also, portions of the primary winding 318, the upper winding extension 320A, and the lower winding extension 320B of the second inductor 308 are visible. Also, the side contacts 304A-304D are visible.

Figure 3F:
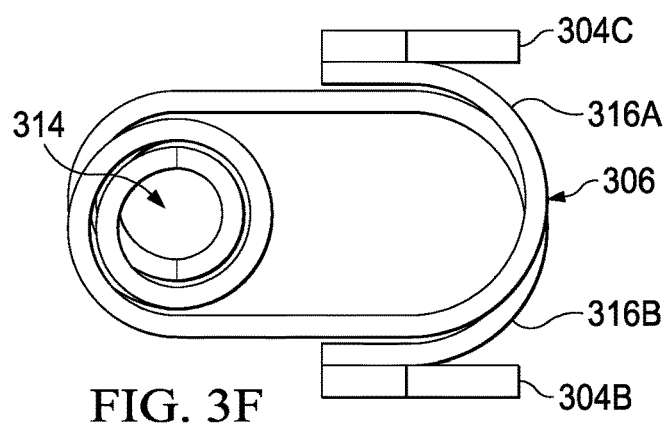

FIG. 3F shows another top view of some components of the module 300. In FIG. 3F, the primary winding 314, the upper winding extension 316A, and the lower winding extension 316B of the first inductor 306 are visible along with side contacts 304B and 304C. As can be understood from FIGS. 3E and 3F, when the first and second inductors 306 and 308 are assembled for the module 300 and are viewed from the top, part of lower winding extension 316B of the first inductor 306 is covered by the upper winding extension 320A of the second inductor 308. Likewise, part of the lower winding extension 316B of the first inductor 306 is covered by the upper winding extension 320A of the second inductor 308.

FIGS. 4A-4F show an assembly process 400 for the reversely coupled inductor module 300 of FIGS. 3A-3F. In step 402 of FIG. 4A, the first and second inductors 306 and 308 are obtained. As shown, the first inductor 306 initially includes the primary winding 314 with upper and lower winding extensions 316A and 316B that are straight. Likewise, the second inductor 308 initially includes the primary winding 318 with upper and lower winding extensions 320A and 320B that are straight. In step 404 of FIG. 4B, the first and second inductors 306 and 308 are positioned relative to each other such that axis of the primary winding 314 of the first inductor 306 is parallel with the axis of the primary winding 318 of the second inductor 308. Also, the upper winding extension 316A of the first inductor 306 passes over and in the opposite direction of the lower winding extension 320A of the second inductor 308. Also, the upper winding extension 32A of the second inductor 306 passes over and in the opposite direction of the lower winding extension 318B of the first inductor 306.

Figure 4A:
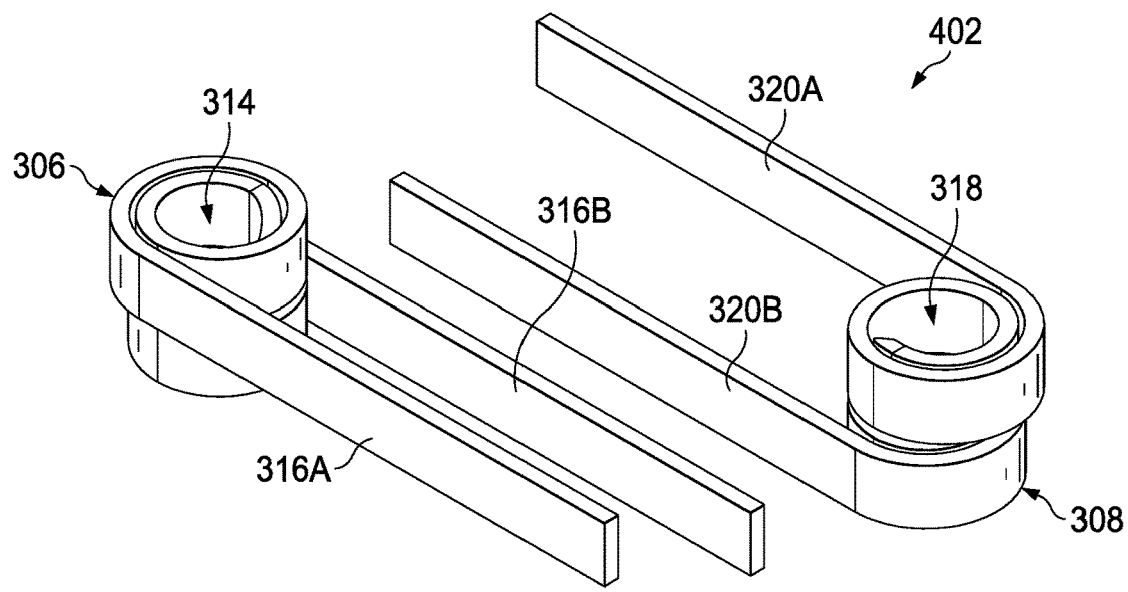
FIGS. 4A-4I show an assembly process for the reversely coupled inductor module of FIGS. 3A-3F.
Figure 4B:
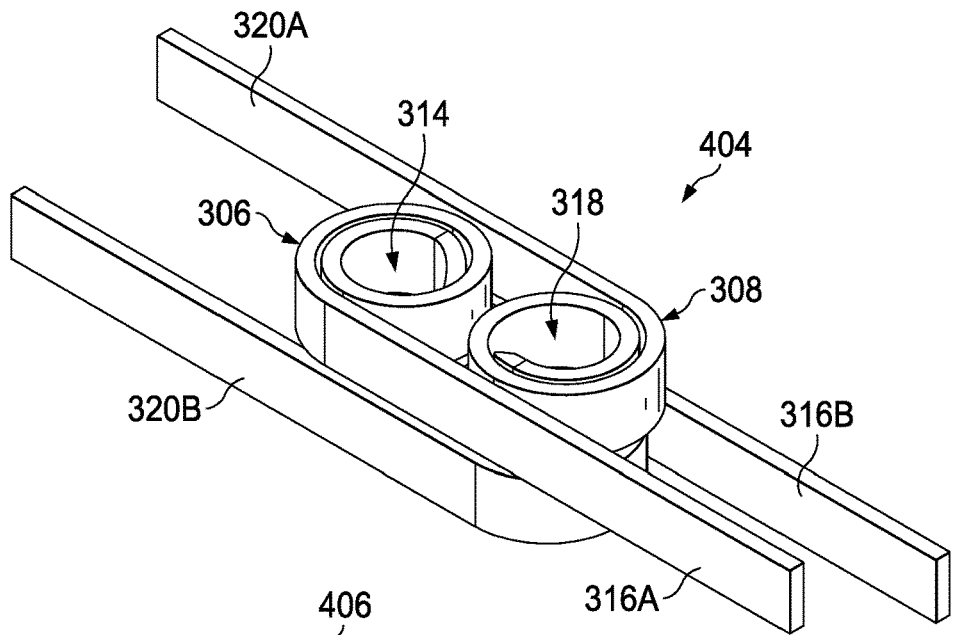
Figure 4C:
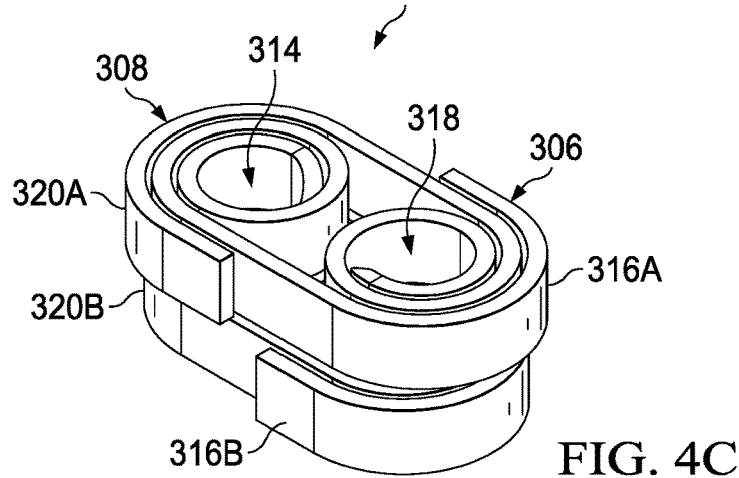
Figure 4D:
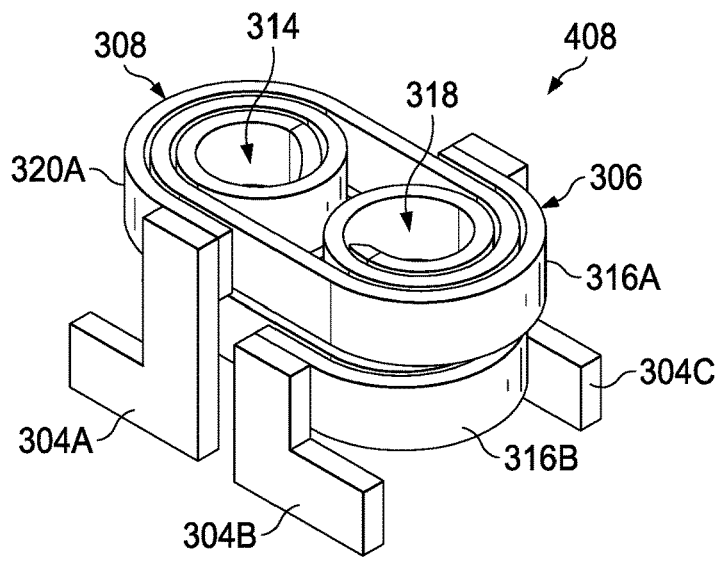
Figure 4E:
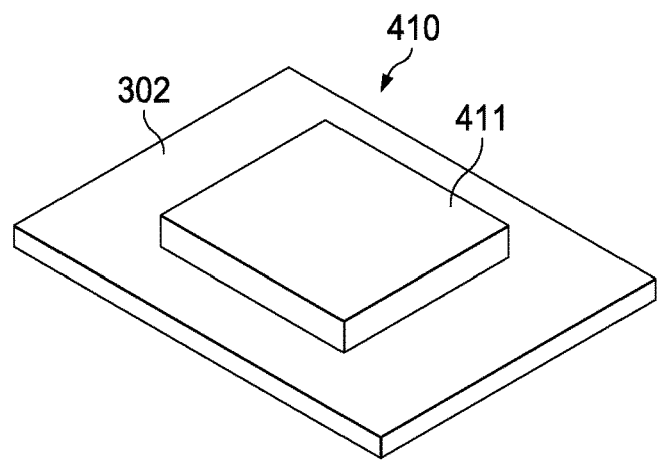
Figure 4F:
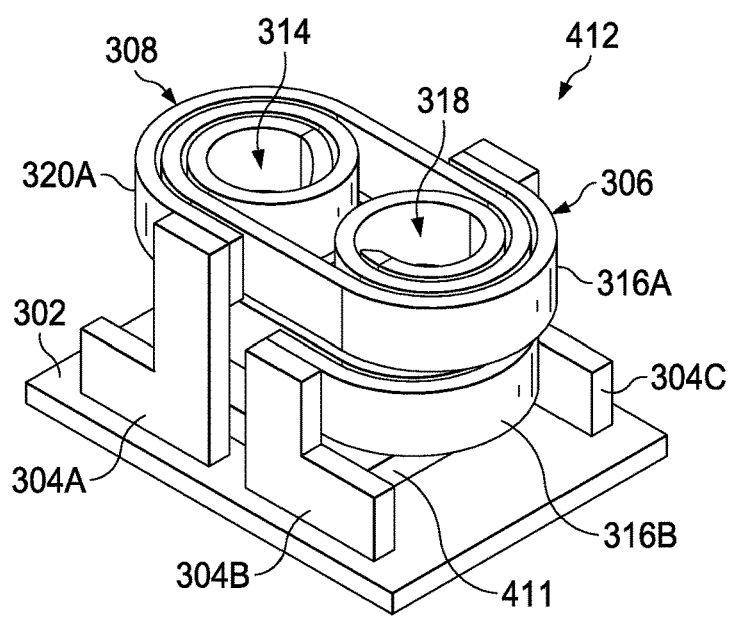
Figure 4G:
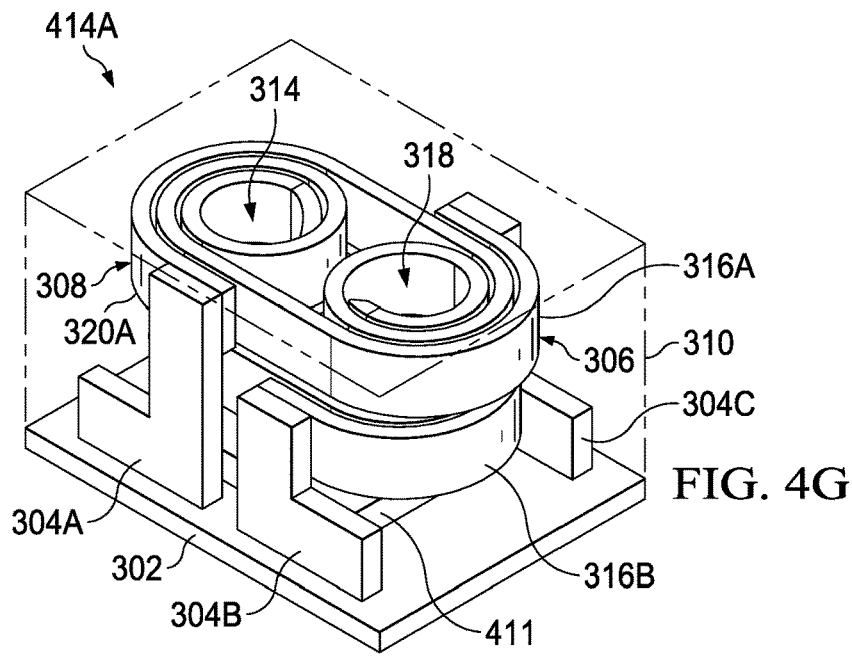
Figure 4H:
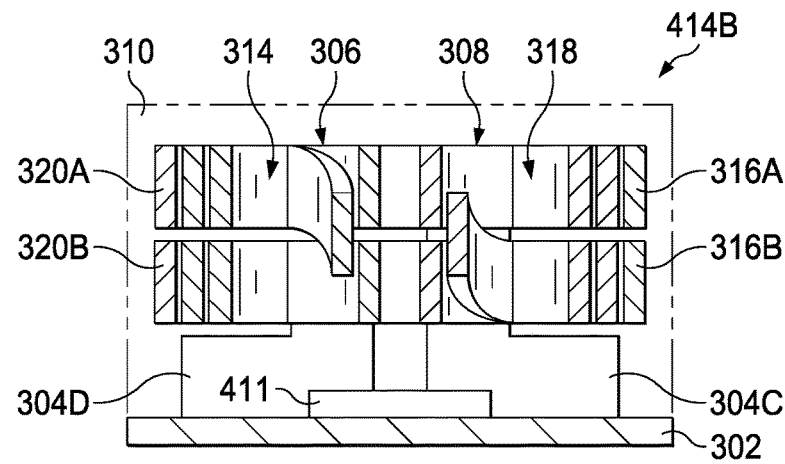
Figure 4I:
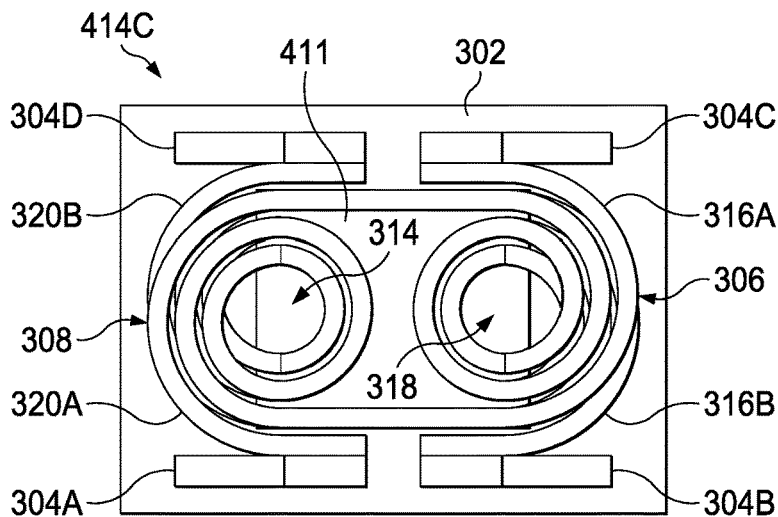

In step 406 of FIG. 4C, the upper and lower winding extensions 316A and 316B of the first inductor 306 are wrapped around primary winding 318 of the second inductor 308. Also, the upper and lower winding extensions 320A and 320B of the second inductor 308 are wrapped around primary winding 314 of the first inductor 306. After step 406 is complete, the first and second inductors 306 and 308 have overlapping windings. In step 408 of FIG. 4D, the first and second inductors 306 and 308 (with overlapping windings) are coupled to the side contacts 304A-304D. In step 410 of FIG. 4E a base (e.g., with an integrated circuit die 411) is obtained. At step 412 of FIG. 4F, the side contacts 304 are coupled to the base 302. As shown, in some examples, the base 302 includes or is coupled to an integrated circuit die 411. In step 414 (represented by views 414A-414C in FIGS. 4G, 4H, and 4I), MMC 310 is added around the first and second inductors 306 and 308. In some examples, adding the MMC 310 results in the module 300 having a solid rectangular shape, where the first and second inductors 306 and 308 are embedded in the MMC 310.

FIGS. 5A-5B are different views of an inductor module in accordance with various examples. In view 500 of FIG. 5A, a module 501 with parallel inductors 502 and 504 with no overlapping windings is represented. In view 510 of FIG. 5B, a cross-sectional view of the module 501 with the parallel inductors 502 and 504 is represented.

FIG. 5C is a graph 520 showing current density for the inductor module 500 of FIGS. 5A and 5B. As shown in graph 520, higher current density levels are located in the inner windings of the parallel inductors 502 and 504. FIG. 5D is a graph 530 showing the magnetic flux density for the inductor module 501 of FIGS. 5A and 5B. As shown in graph 530, the magnetic flux density is concentrated in the interior of the windings for the parallel inductors 502 and 504.

FIGS. 6A-6B are different views 600 and 610 of the reversely coupled inductor module 300 of FIGS. 3A-3F in accordance with various examples. In view 600 of FIG. 6A, the module 300 includes the reversely coupled inductors 306 and 308. In view 610 of FIG. 6B, a cross-sectional view of the module 300 with the reversely coupled inductors 306 and 308 is represented.

FIG. 6C is a graph 620 showing current density for the reversely coupled inductor module 300 of FIGS. 6A and 6B. As shown, in graph 620, current density levels for the module 300 are lower than for the module 501, resulting in lower winding losses in module 300 compared to module 501. FIG. 6D is a graph 630 showing the magnetic flux density for the inductor module 300 of FIGS. 6A and 6B. As shown in graph 630, the magnetic flux density is concentrated in the interior of the primary windings for the reversely coupled inductor modules 306 and 308, and is lower intensity than the magnetic flux density represented for the inductor module 501 in graph 530, resulting in lower core losses in module 300 compared to module 501.

FIGS. 7A-7D are different views of a reversely coupled inductor module 700 in accordance with various examples. As shown in FIG. 7A, the module 700 includes a base (e.g., a leadframe base) 702. Attached to the base 702 are a first inductor 704 and second inductor 706 with overlapping windings, where a magnetic core 708 is used. Also, MMC 710 fills the space around the first inductor 704, the second inductors 706, and the magnetic core 708. In operation, a first current 311 flows through the first inductor 704, and a second current 312 flows through the second inductor 706, where the first and second currents 311 and 312 flow in the same direction. In the example of FIG. 7A, the dimensions of the module 700 is 8 mm×7 mm×4.5 mm. In other examples, the dimensions for a module such as the module 700 vary in one or more dimensions.

FIG. 7B is a perspective view of the magnetic core 708. As shown, the magnetic core 708 includes an upper portion 720, a middle portion 722, and a lower portion 724. When viewed from the side as in FIG. 7D, the upper portion 720, the middle portion 722, and the lower portion 724 of the magnetic core 708 form an H-shape. In the example of FIG. 7B, the lower portion 724 includes corner gaps or cut-outs 726 to enable material of the first and second inductors 704 and 706 to pass through the corner gaps 726 as represented in FIG. 7A.

In FIG. 7C, a side view that includes the magnetic core 708 and the first and second inductors 704 and 706 is represented. In the example related to FIGS. 7A and 7C, the first inductor 704 includes an overlapping extension 730A, two middle extensions 730B, and two base extensions 730C. Similarly, the second inductor 706 includes an overlapping extension 732A, two middle extensions 732B, and two base extensions 732C. In some examples, each of the overlapping extensions 730A and 732A has a flat U-shape (best seen in FIG. 7A), where the overlapping extension 730A of the first inductor 704 is oriented 180 degrees opposite from the overlapping extension 732A of the second inductor 706. For the first inductor 704, the two middle extensions 730B and the two base extensions 730C extend from opposite sides of the U-shaped overlapping extension 730A. Similarly, for the second inductor 706, the two middle extensions 732B and the two base extensions 732C extend from opposite sides of the U-shape overlapping extension 732A.

In the example of FIG. 7C, the base extensions 730C of the first inductor 704 and the base extensions 732C of the second inductor 706 are positioned between the base 702 and the lower portion 724 of the magnetic core 708. Meanwhile, the middle extensions 730B of the first inductor 704 and the middle extensions 730B of the second inductor 706 extend through the corner gaps 726 in the lower portion 724 of the magnetic core 708 to the area around the middle portion 722. In the example of FIGS. 7A-7D, the middle extensions 730B of the first inductor 704 is longer than the middle extensions 732B of the second inductor 706 (the first and second inductors 704 and 706 are asymmetric) to facilitate fitting the overlapping extensions 730A and 732A between the upper and lower portions 720 and 724 of the magnetic core 708. With the arrangement represented in FIGS. 7A and 7C, the first and second inductors 704 and 706 are described herein as having overlapping windings in the form of a stacked arrangement (the overlapping extension 730A of the first inductor 704 is stacked on the overlapping extensions 732A of the second inductor 706).

Figure 8B:
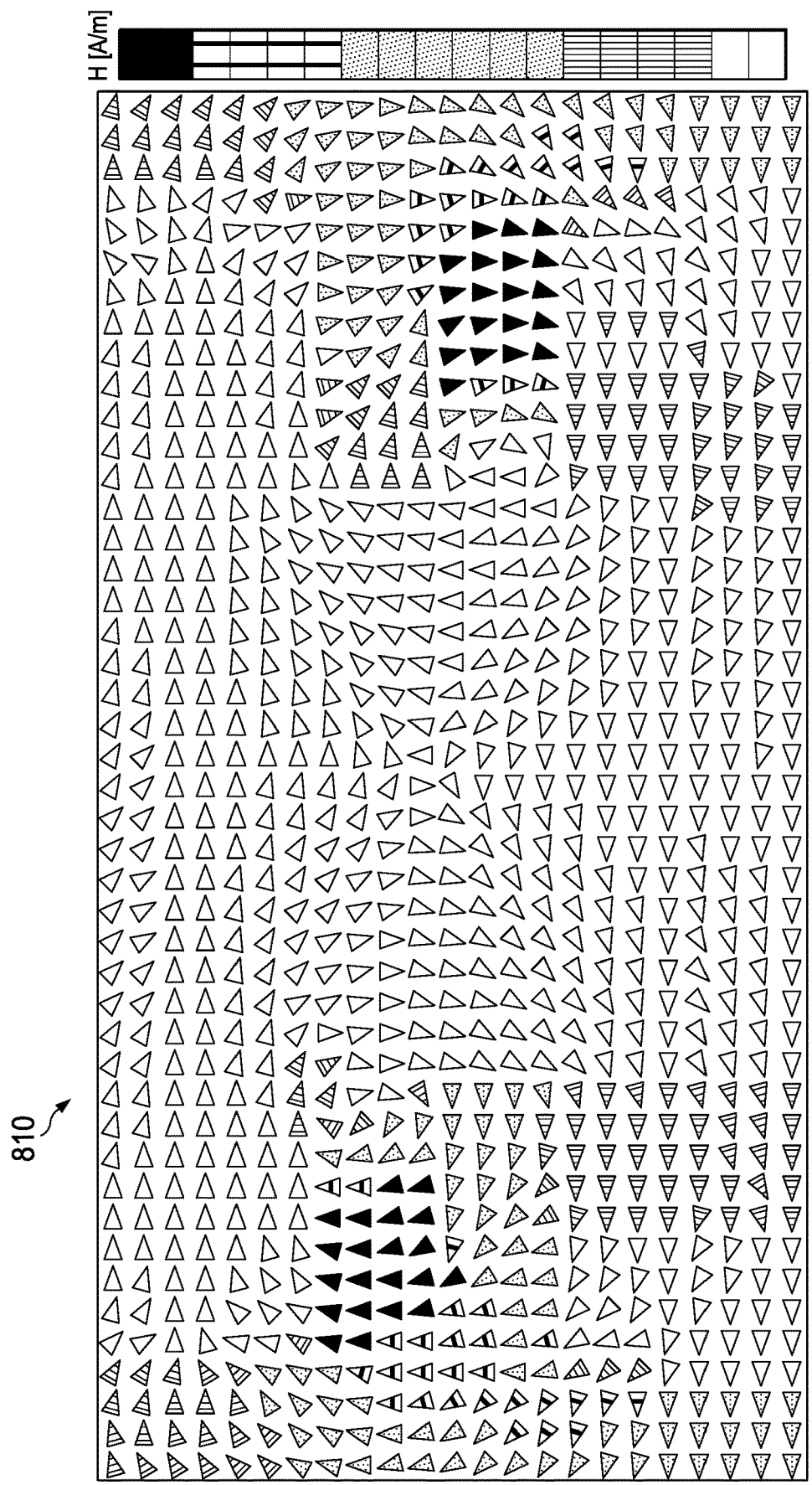
FIG. 8B is a graph showing the magnetic field strength for the reversely coupled inductor module of FIGS. 7A-7D.

FIG. 8A is a cross-sectional view 800 of the reversely coupled inductor module 700 related to FIGS. 7A-7D. In the cross-sectional view 800, the H-shape of the magnetic core 708 is visible. Again, the H-space of the magnetic core 708 is formed by the upper portion 720, the middle portion 722, and the lower portion 724 of the magnetic core 708. Also, in the cross-sectional view 800, the overlapping extension 730A, one middle extension 730B, and one base extension 730C of the first inductor 704 are visible. Also, the overlapping extension 732A, one middle extension 732B, and one base extension 732C of the second inductor 706 are visible. Also, in the cross-sectional view 800, the base 702 and the MMC 710 for the module 700 are represented. FIG. 8B is a graph 810 showing the magnetic field strength for the reversely coupled inductor module 700 related to FIGS. 7A-7D. As shown in graph 810, the distributed air gaps in MMC 710 absorbs most of the magnetic field strength induced by the direct-current bias.

Figure 9A:
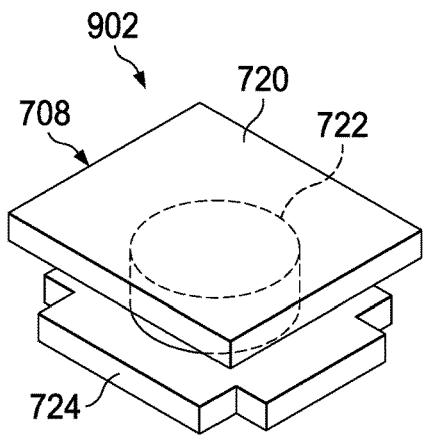
FIGS. 9A-9R show an assembly process for the reversely coupled inductor module of FIGS. 7A-7D in accordance with various examples.
Figure 9D:
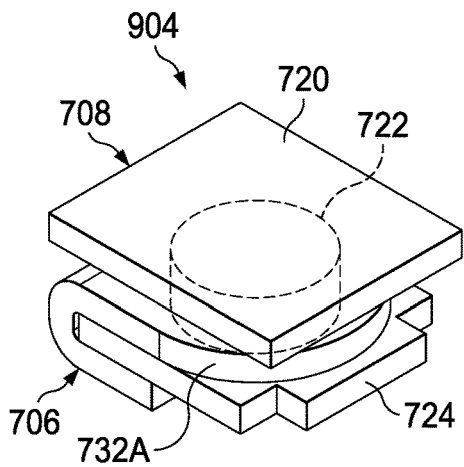
Figure 9B:
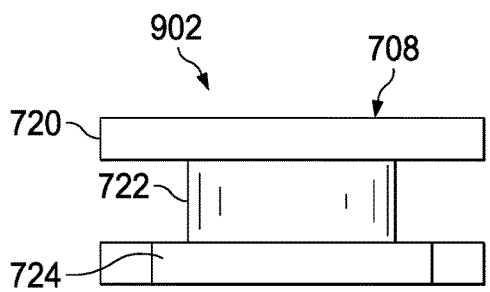
Figure 9E:
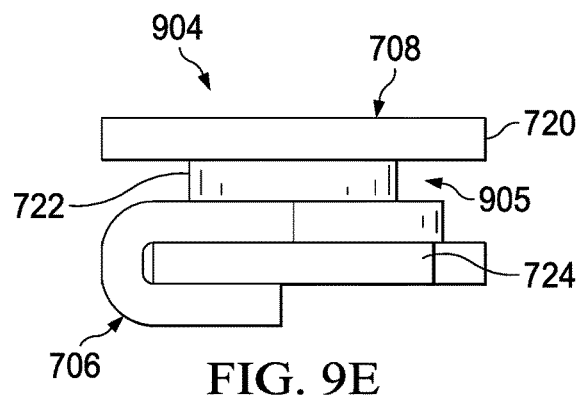
Figure 9C:
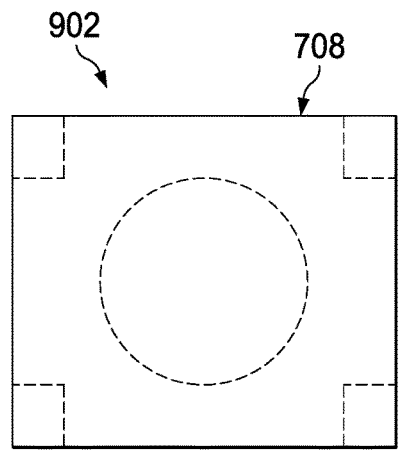
Figure 9F:
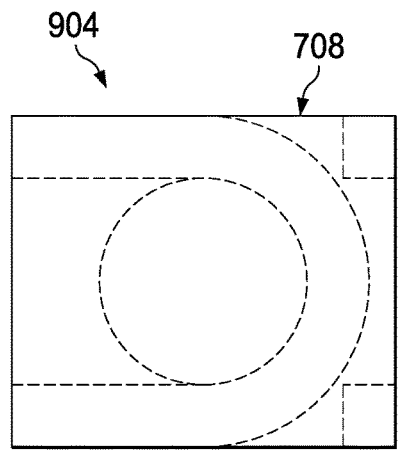
Figure 9G:
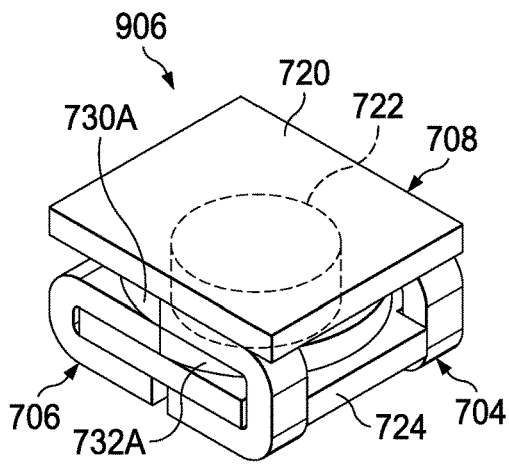
Figure 9J:
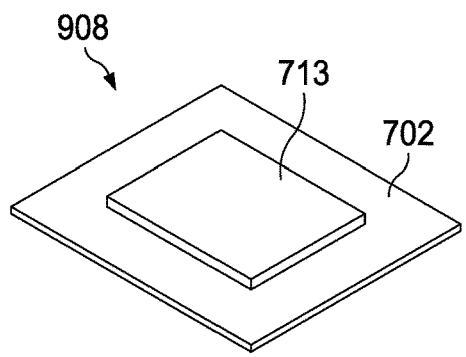
Figure 9H:
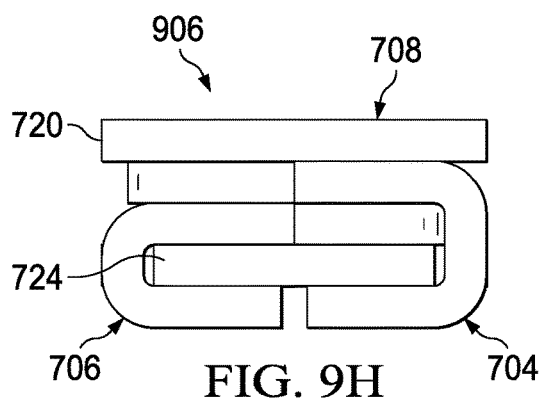
Figure 9K:
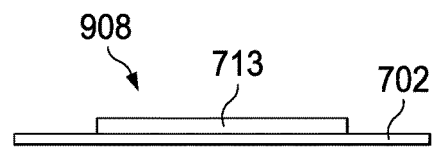
Figure 9I:
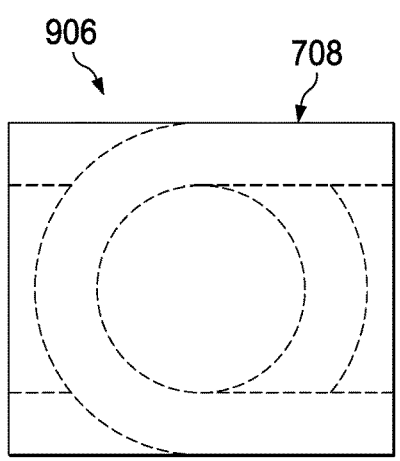
Figure 9L:
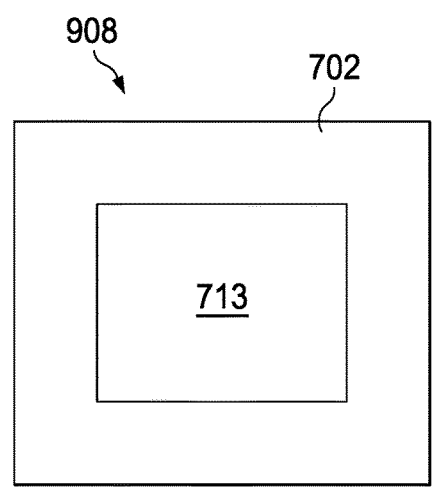
Figure 9M:
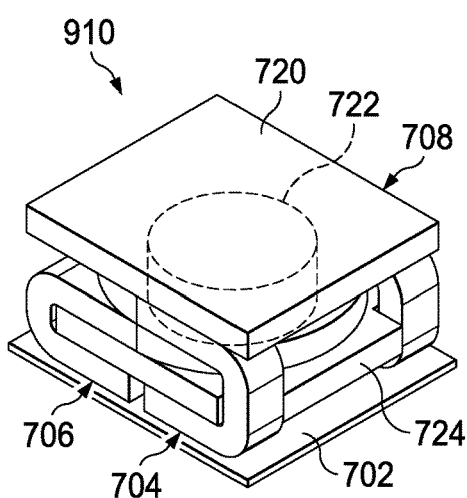
Figure 9P:
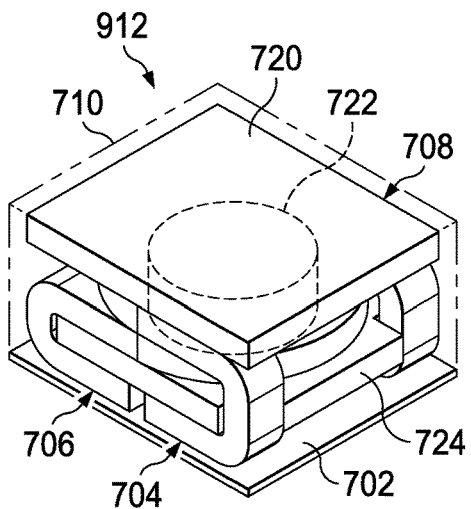
Figure 9N:
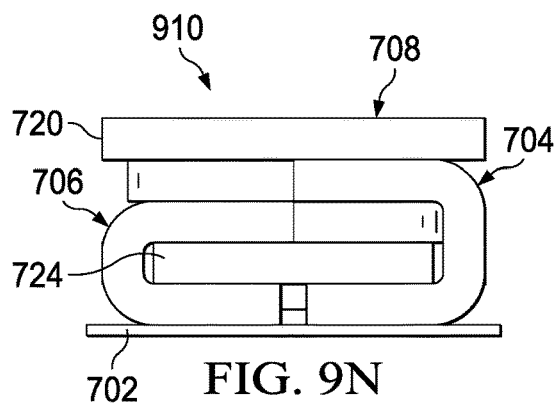
Figure 9Q:
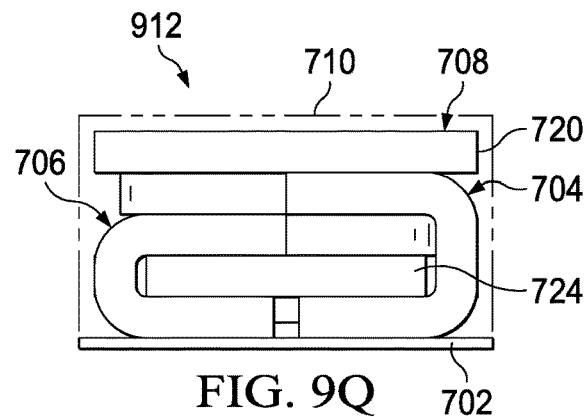
Figure 9O:
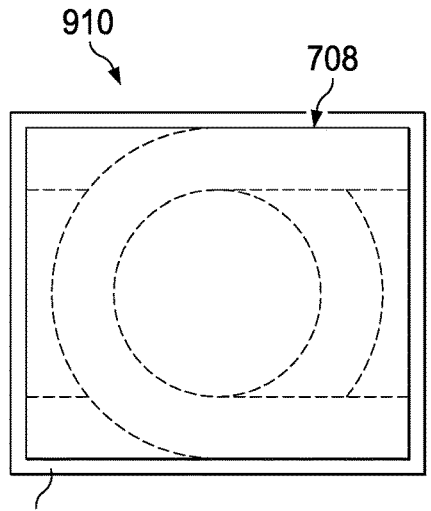
Figure 9R:
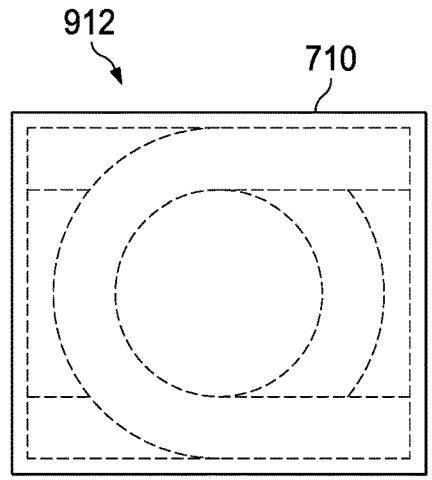

FIGS. 9A-9R show an assembly process 900 for the reversely coupled inductor module 700 of FIGS. 7A-7D in accordance with various examples. The process 900 of FIG. 9 starts at step 902 (represented in FIGS. 9A-9C) with obtaining the magnetic core 708. More specifically, FIG. 9A is a perspective view of the magnetic core 708, FIG. 9B is a side view of the magnetic core 708, and FIG. 9C is a top view of the magnetic core 708. At step 904 (represented in FIGS. 9D-9F), the second inductor 706 is positioned relative to the magnetic core 708. As described above in connection with FIGS. 7A-7D and as depicted in FIGS. 9D-9F, the overlapping extension 732A for the second inductor 706 has a flat U-shape, where the U-shape fits around the middle portion 722 of the magnetic core 708. In some examples, the middle extensions 732B and the base extensions 732C are bent around the lower portion 724 of the magnetic core 708 after the overlapping extension 732A is in place around the middle portion 722. At step 906 (represented in FIGS. 9G-9I), the first inductor 704 is positioned relative to the magnetic core 708 and the second inductor 706. As described above in connection with FIGS. 7A-7D and as depicted in FIGS. 9G-9I, the overlapping extension 732A for the second inductor 706 has a flat U-shape, where the U-shape fits around the middle portion 722 of the magnetic core 708. In some examples, the middle extensions 730B and the base extensions 730C of the first inductor 704 are bent around the lower portion 724 of the magnetic core 708 after the overlapping extension 730A is in place around the middle portion 722 and above the overlapping extension 732A of the second inductor 706.

At step 908 (represented in FIGS. 9J-9L), the base 702 is obtained. In the example of FIGS. 9J-9I, the base 702 includes or is coupled to an integrated circuit die 713 (e.g., with multi-phase converter components such as the components described in FIG. 1). More specifically, FIG. 9J is a perspective view of the base 702 with the integrated circuit die 713, FIG. 9K is a side view of the base 702 with the integrated circuit die 713, and FIG. 9I is a top view of the base 702 with the integrated circuit die 713. At step 910 (represented in FIGS. 9M-9O), the assembly including the magnetic core 708, the second inductor 706, and the first inductor 704 are attached to the base 702. At step 912 (represented in FIGS. 9P-9Q), MMC 710 is applied to the assembly of the base 702, the magnetic core 708, the second inductor 706, and the first inductor 704.

Figure 10C:
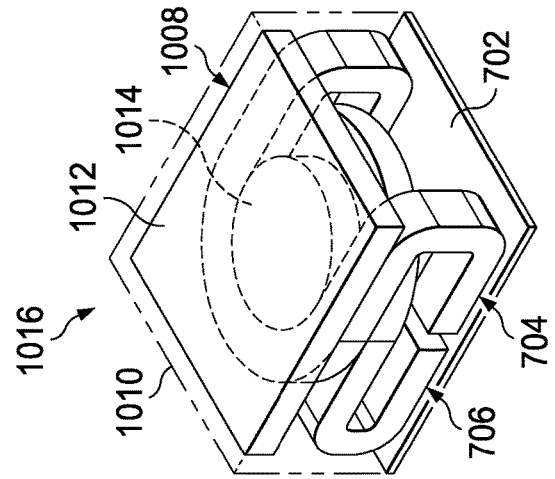
FIGS. 10A-10F show different reversely coupled inductor module options in accordance with various examples.
Figure 10D:
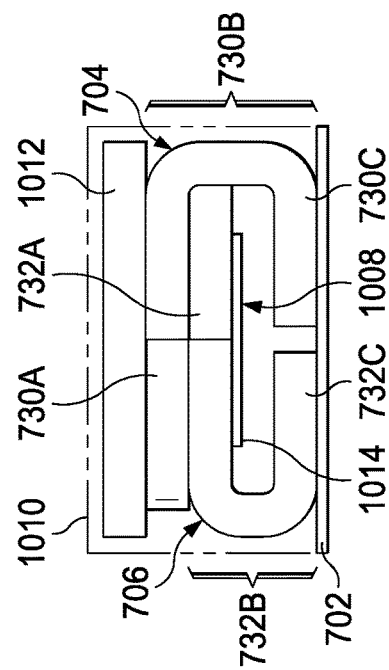
Figure 10A:
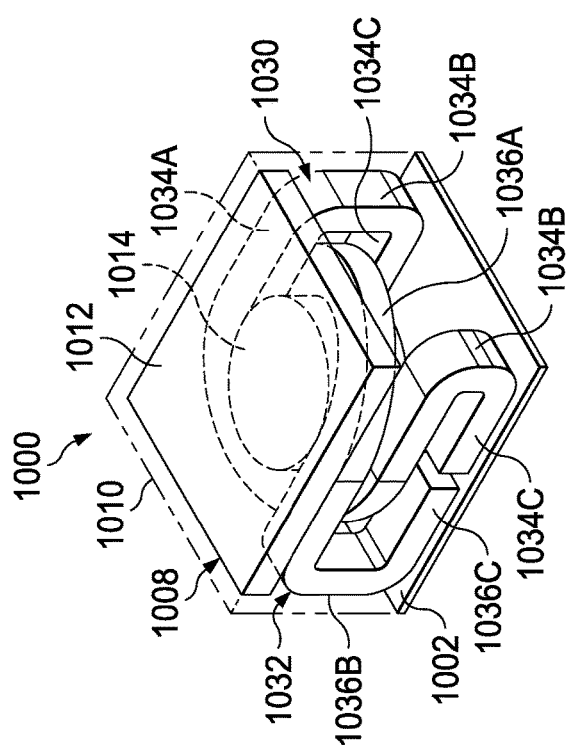
Figure 10B:
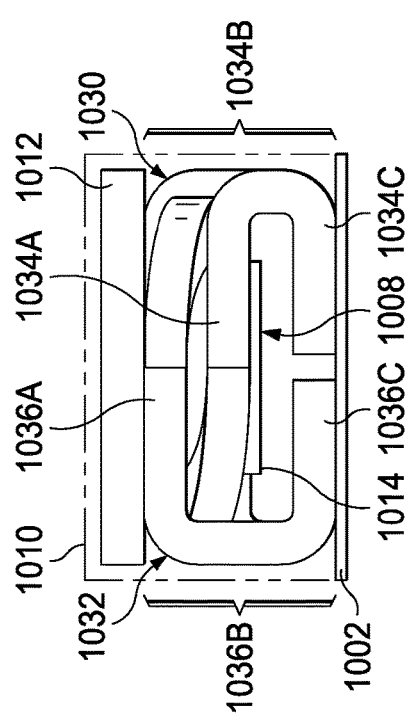

FIGS. 10A-10F show different reversely coupled inductor module options in accordance with various examples. In FIGS. 10A and 10B, a module 1000 with a base 1002, a first inductor 1030, a second inductor 1032, a magnetic core 1008, and MMC 1010 is represented. For the module 1000, the first and second inductors 1030 and 1032 are symmetric. More specifically, the first inductor 1030 includes an overlapping extension 1034A, two middle extensions 1034B, and two base extensions 1034C. Similarly, the second inductor 1032 includes an overlapping extension 1036A, two middle extensions 1036B, and two base extensions 1036C. In contrast to the first and second inductors 704 and 706 described for the module 700, each of the overlapping extension 1034A and 1036A for the first and second inductors 1030 and 1032 has a ramped U-shape. Also, for the module 1000, the magnetic core 1008 has a T-shape with an upper portion 1012 and a stem portion 1014, where the stem portion 1014 extends between the overlapping extensions 1034A and 1036A of the first and second inductors 1030 and 1032, and where the upper portion 1012 of the magnetic core 1008 is above the first and second inductors 1030 and 1032. With the arrangement represented in FIGS. 10A and 10B, the first and second inductors 1030 and 1032 are described herein as having overlapping windings in the form of a dual-ramp arrangement (the overlapping extension 1034A of the first inductor 1030 and the overlapping extensions 1036A of the second inductor 1032 are both ramped).

In FIGS. 10C and 10D, a module 1016 with the base 702, the first inductor 704, the second inductor 706, the magnetic core 1008, and MMC 1010 is represented. As described above in connection with FIGS. 7A-7D, the first and second inductors 704 and 706 are asymmetric (due to the middle extensions 730B of the first inductor 704 being longer than the middle extensions 732B of the second inductor 706). In contrast to the ramped U-shape of the overlapping extensions 1034A and 1036A of the first and second inductors 1030 and 1032 described for the module 1000, the overlapping extensions 730A and 732A of the first and second inductors 704 and 706 have a flat U-shape. The module 1016 of FIGS. 10C and 10D differ from the module 700 of FIGS. 7A-7D at least because the magnetic core 1008 has a T-shape. More specifically, the T-shape for the magnetic core 1008 includes an upper portion 1012 and a stem portion 1014, where the stem portion 1014 extends between the overlapping extensions 730A and 732A of the first and second inductors 704 and 706, and where the upper portion 1012 of the magnetic core 1008 is above the first and second inductors 704 and 706.

Figure 10E:
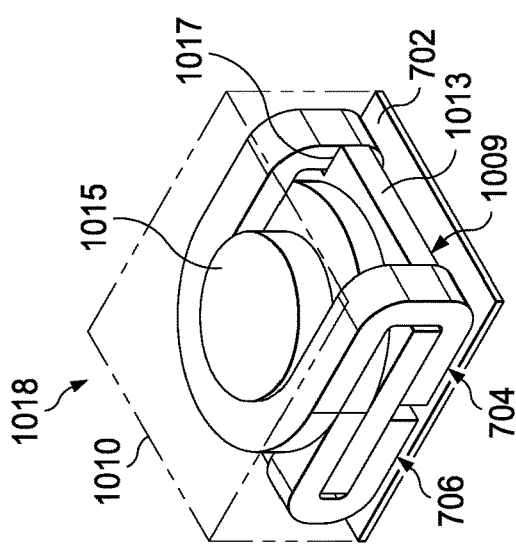
Figure 10F:
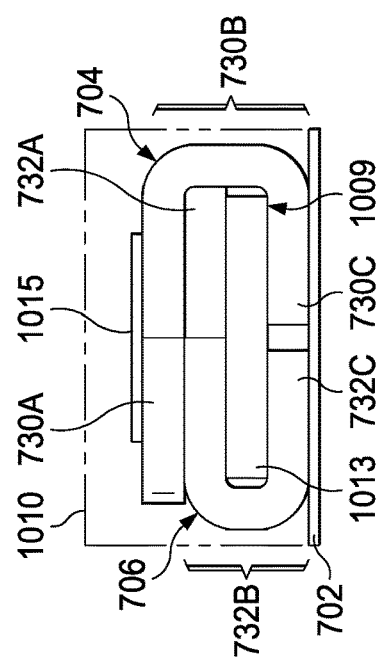

In FIGS. 10E and 10F, a module 1018 with the base 702, the first inductor 704, the second inductor 706, a magnetic core 1009, and MMC 1010 is represented. As described above in connection with FIGS. 7A-7D, the first and second inductors 704 and 706 are asymmetric (due to the middle extensions 730B of the first inductor 704 being longer than the middle extensions 732B of the second inductor 706). The module 1018 of FIGS. 10E and 10F differ from the module 700 of FIGS. 7A-7D at least because the magnetic core 1008 has a T-shape. More specifically, the T-shape for the magnetic core 1009 includes an upper portion 1013 and a stem portion 1015, where the stem portion 1015 extends between the overlapping extensions 730A and 732A of the first and second inductors 704 and 706, and where the upper portion 1013 of the magnetic core 1009 is below the overlapping extensions 730A and 732A of the first and second inductors 704 and 706. In some examples, the magnetic core 1009 has corner gaps or cut-outs 1017 in the upper portion 1013 to facilitate positioning the middle extensions 730B and 732B of the first and second inductors 704 and 706 relative to the magnetic core 1009.

Figure 11C:
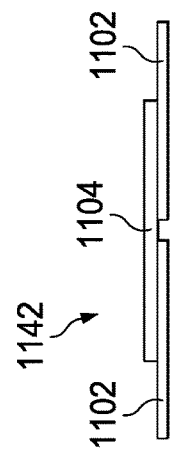
FIGS. 11A-11P show another assembly process for a reversely coupled inductor module in accordance with various examples.
Figure 11D:
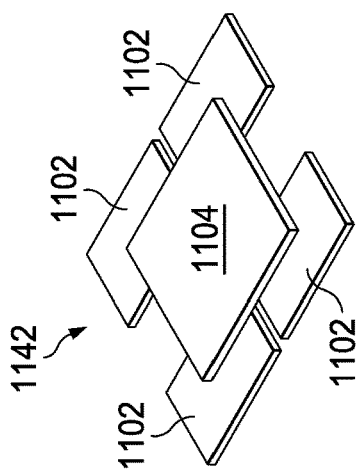
Figure 11A:
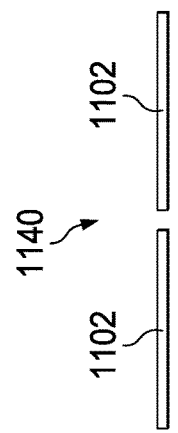
Figure 11B:
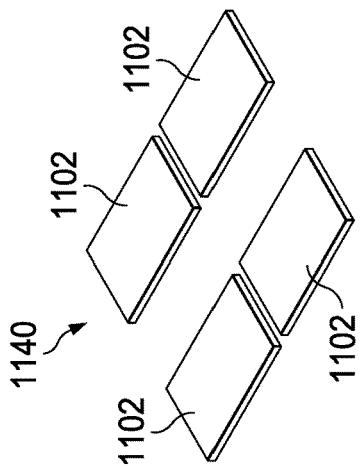
Figure 11E:
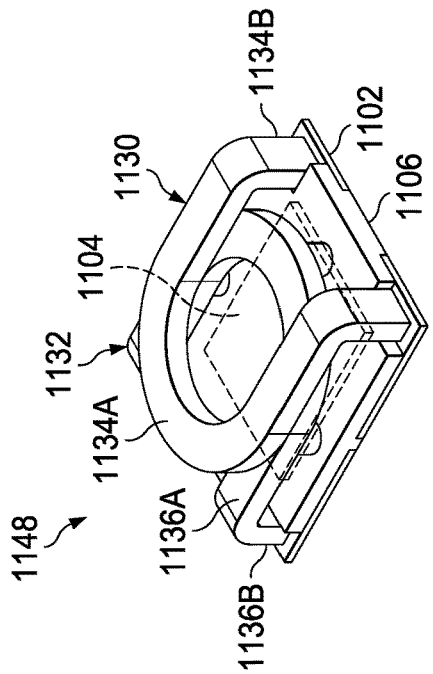
Figure 11G:
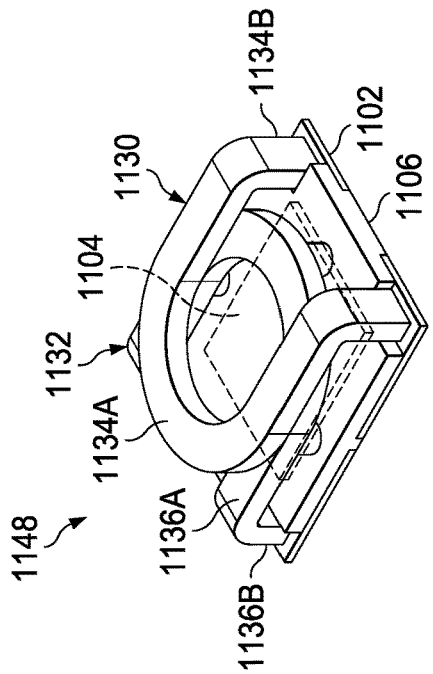
Figure 11I:
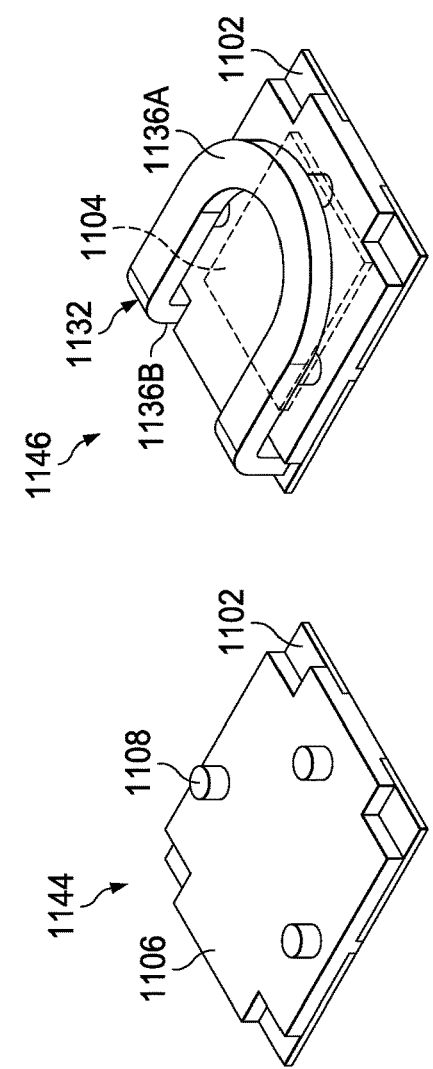
Figure 11F:
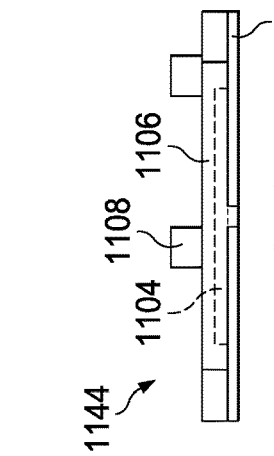
Figure 11H:
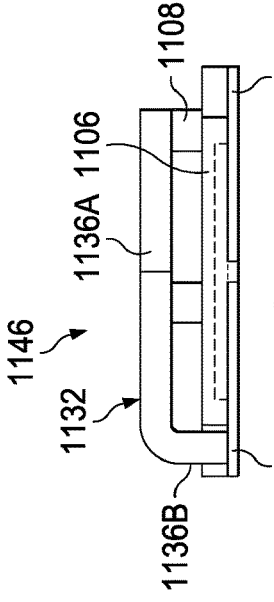
Figure 11J:
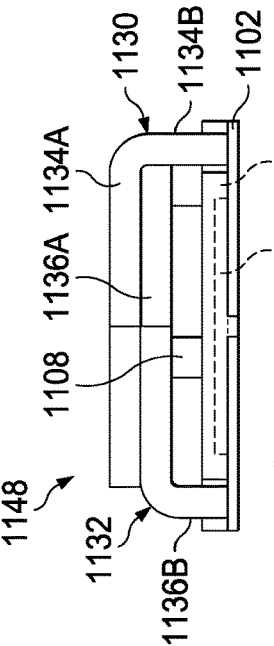
Figure 11K:
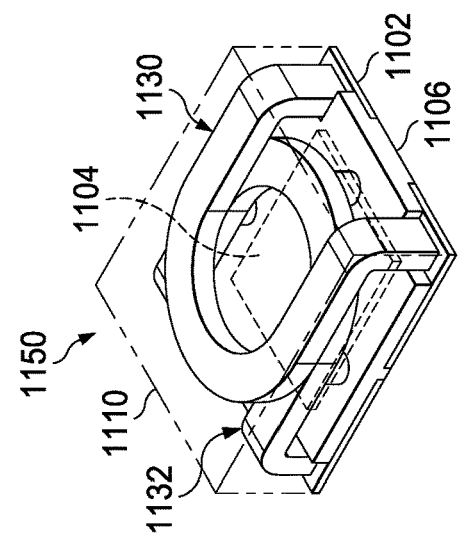
Figure 11M:
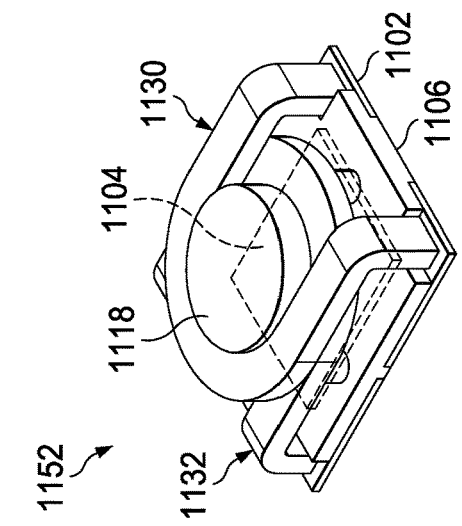
Figure 11O:
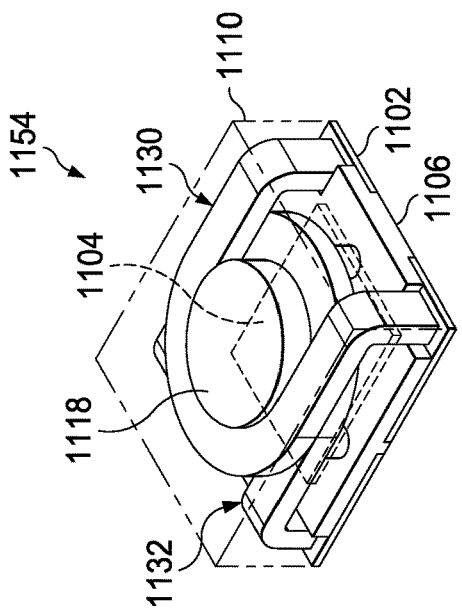
Figure 11L:
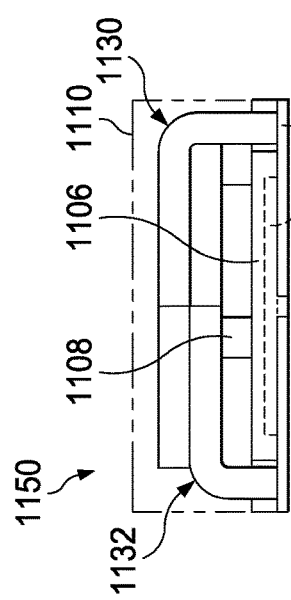
Figure 11N:
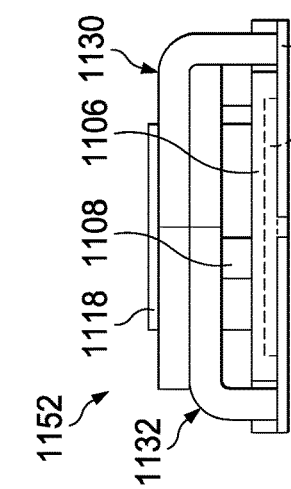
Figure 11P:
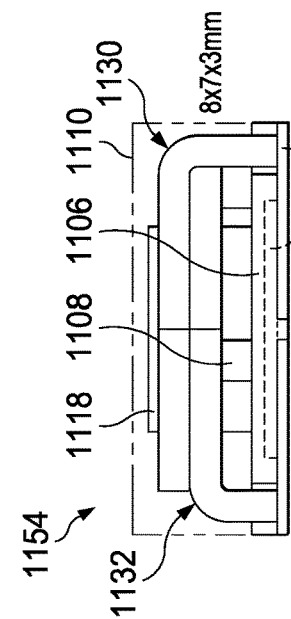

FIGS. 11A-11P shows another assembly process 1100 for a reversely coupled inductor module in accordance with various examples. As shown, the process 1100 includes obtaining a plurality of leadframe terminals 1102 at step 1140 (represented in FIGS. 11A and 11B). In some examples, the leadframe terminals 1102 have a height of 0.2 mm. At step 1142 (represented in FIGS. 11C and 11D), an integrated circuit die 1104 is coupled to the leadframe terminals 1102. In some examples, the four-terminal leadframe represented in FIGS. 11C and 11D is not a final design of the leadframe for the respective module. The four terminals 1102 represented in FIGS. 11C and 11D are only for the coupled inductors. In some examples, additional traces and layouts are used to ensure the integrated circuit die 1104 operates properly. At step 1144 (represented in FIGS. 11E and 11F), molding 1106 is applied to cover the integrated circuit die 1104. Also, standoffs 1108 are added to or are formed with the molding 1106 during step 1144.

At step 1146 (represented in FIGS. 11G and 11H), a second inductor 1132 that includes an overlapping extension 1136A (e.g., a flat U-shape) and two contact extensions 1136B is coupled to two of the leadframe terminals 1102 (e.g., the two contact extensions 1136B are coupled to two of the leadframe terminals 1102). In FIGS. 11G and 11H, the overlapping extension 1132A of the second inductor 1132 is separated from the integrated circuit die 1104 by the molding 1106 and/or the standoffs 1108. The second inductor 1132 is different than the second inductor 706 in FIGS. 7A-7D at least because there are no base extensions for the second inductor 1132. At step 1148 (represented in FIGS. 11I and 11J), a first inductor 1130 that includes an overlapping extension 1134A (e.g., a flat U-shape) and two contact extensions 1134B is coupled to the other two leadframe terminals 1102 (e.g., the two contact extensions 1134B are coupled to the two leadframe terminals 1102 still available after the second inductor 1132 is coupled to two of the leadframe terminals 1102). As represented in the views provided in FIGS. 11I and 11J, the overlapping extension 1134A of the first inductor 1130 is positioned over the overlapping extension 1136A of the second inductor 1132 in step 1148, where the orientation of the overlapping extensions 1134A of the first inductor 1130 and the overlapping extension 1136A of the second inductor 1130 is 180 degrees opposite relative to each other. Also, the first inductor 1130 is different than the first inductor 704 in FIGS. 7A-7D at least because there are no base extensions for the first inductor 1130.

In some examples, the process 1100 proceeds from step 1148 to step 1150 (represented in FIGS. 11K and 11L), where MMC 1110 is applied around the first and second inductors 1130 and 1132. In other examples, the process 1100 proceeds from step 1148 to step 1152 (represented in FIGS. 11M and 11N), where a magnetic core 1118 is inserted between the overlapping portion 1134A of the first inductor 1130 and the overlapping portion 1136A of the second inductor 1132. At step 1154 (represented in FIGS. 11O and 11P), MMC 1110 is applied around the first inductor 1130, the second inductor 1132, and the magnetic core 1118.

In this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A module, comprising:
   a magnetic core including a first magnetic core portion and a second magnetic core portion, the first magnetic core portion including first, second, third, and fourth cutouts;
   a first inductor including a first portion, a second portion, and a third portion coupled between the first and second portions, in which the first portion wraps around the first cutout, the second portion wraps around the second cutout, and the third portion wraps around the second magnetic core portion; and
   a second inductor including a fourth portion, a fifth portion, and a sixth portion coupled between the fourth and fifth portions, in which the fourth portion wraps around the third cutout and overlaps with a part of the third portion, the fifth portion wraps around the fourth cutout and overlaps with a part of the third portion, and the sixth portion wraps around the second magnetic core portion.

2. The module of claim 1, wherein the first and second magnetic core portions form a T-shape.

3. The module of claim 1, wherein the first and second inductors are reversely coupled.

4. The module of claim 1, wherein the third portion overlaps at least a part of the sixth portion.

5. The module of claim 1, wherein a part of the first portion, a part of the second portion and the third portion form a first winding, and a part of the fourth portion, a part of the fifth portion, and the sixth portion form a second winding that overlaps at least part of the first winding.

6. The module of claim 1, wherein the magnetic core includes a third magnetic core portion, wherein the second magnetic core portion is between the first and second magnetic core portions, and the third magnetic core portion overlaps with the third portion and the sixth portion.

7. The module of claim 6, wherein the first, second, and third magnetic core portions form an H-shape.

8. The module of claim 1, further comprising a magnetic molding compound encapsulating at least parts of the first and second inductors and at least a part of the magnetic core.

9. The module of claim 8, wherein the magnetic molding compound includes air gaps.

10. The module of claim 1, further comprising a housing enclosing the first and second inductors and the magnetic core.

11. The module of claim 10, further comprising a magnetic molding compound filling in at least some of spaces between the housing and the first and second inductors and the magnetic core.

12. The module of claim 11, wherein the magnetic molding compound includes air gaps.

13. The module of claim 1, wherein each of the first, second, fourth, and fifth portions has a respective U-shape.

14. The module of claim 13, further comprising a base on which the first, second, fourth, and fifth portions are mounted.

15. The module of claim 14, wherein the base includes a lead frame.

16. The modulate of claim 14, wherein the first, second, fourth, and fifth portions are mounted on a first surface of the base; and wherein the module further comprises an integrated circuit mounted on a second surface of the base opposing the first surface.

17. The module of claim 16, wherein the integrated circuit includes a multi-phase power converter controller.

\* \* \* \* \*